(12) United States Patent
Savage

(10) Patent No.: US 7,163,128 B2
(45) Date of Patent: Jan. 16, 2007

(54) HARD ICE CREAM DISPENSER

(76) Inventor: Don H. Savage, 11889 S. Hidden Valley Club Dr., Sandy, UT (US) 84092

( * ) Notice: Subject to any disclaimer, the term of this patent is extended or adjusted under 35 U.S.C. 154(b) by 245 days.

(21) Appl. No.: 10/850,694

(22) Filed: May 20, 2004

(65) Prior Publication Data

US 2005/0258187 A1    Nov. 24, 2005

(51) Int. Cl.
B67D 5/62 (2006.01)
(52) U.S. Cl. .................. 222/146.6; 222/1; 222/326; 222/333; 222/386; 222/567
(58) Field of Classification Search ............ 222/146.6, 222/386, 390, 326–327, 340, 333, 566–567, 222/575, 570, 542, 1, 181.3, 185.1, 181.2; 62/340–341; 425/276, 278, 279, 282
See application file for complete search history.

(56) References Cited

U.S. PATENT DOCUMENTS

| | | | |
|---|---|---|---|
| 2,631,761 A * | 3/1953 | Gates ........................ 222/390 |
| 3,931,915 A * | 1/1976 | Downings et al. .......... 222/327 |
| 4,420,948 A | 12/1983 | Savage |
| 4,674,968 A | 6/1987 | Durst |
| 4,707,997 A | 11/1987 | Bigler et al. |
| 4,762,483 A | 8/1988 | Zevlakis |
| 4,830,864 A | 5/1989 | Zevlakis |
| 5,149,551 A | 9/1992 | Anderson |
| 5,385,464 A | 1/1995 | Anderson |
| 5,632,415 A | 5/1997 | McGill |
| 5,775,533 A * | 7/1998 | Schroeder .................... 222/95 |
| 5,816,455 A * | 10/1998 | Alpers et al. ............... 222/388 |
| 5,893,485 A | 4/1999 | McGill |
| 5,918,767 A | 7/1999 | McGill |
| 6,105,820 A | 8/2000 | McGill |
| 6,182,862 B1 | 2/2001 | McGill |
| 6,319,532 B1 * | 11/2001 | Pineault ...................... 426/516 |
| 2006/0006199 A1 * | 1/2006 | Shin .......................... 222/390 |

* cited by examiner

Primary Examiner—Frederick C. Nicolas
(74) Attorney, Agent, or Firm—Thorpe North & Western LLP

(57) ABSTRACT

A hard ice cream dispenser configured to dispense hard ice cream. The hard ice cream dispenser comprises a housing support structure; a drive assembly coupled to and supported by the housing, and having a plunger drive means configured to displace a plunger; a sleeve supportable within the housing and configured to receive an inverted container of hard ice cream therein, wherein the sleeve provides lateral and longitudinal support to the ice cream container as the plunger travels through the container; and a nozzle removably coupled to an end of the support sleeve so as to be in fluid communication with the container of ice cream, wherein the nozzle comprises a spout for controlling the volume and cross-sectional size of dispensed ice cream. The plunger is configured to be supported within the housing and removably coupled to the plunger drive means, wherein the plunger functions to displace the ice cream from the container, into and through the nozzle, and out the spout.

41 Claims, 19 Drawing Sheets

HARD ICE CREAM DISPENSER

FIELD OF THE INVENTION

This invention relates generally to food product dispensing units or systems, and more particularly to a dispenser or dispensing system configured to dispense hard ice cream and various other solid food products having a relatively low degree of pliability.

BACKGROUND OF THE INVENTION AND RELATED ART

Food dispensers are common in the art and are typically employed to dispense various forms of food products in a convenient, efficient, and economic manner. Food dispensers are present in virtually every environment involving the serving or storing of a food product, including restaurants, convenient stores, and at various entertainment venues. Their ability to conveniently store and dispense a specific amount of a food product upon demand is what makes food dispensers so attractive. Indeed, many food products or their packaging have been modified in order that the food product might more easily be served from a dispenser.

A common problem in the food service industry, particularly restaurants and other similar merchant venues, is the need to continuously balance food production with that of food consumption by its patrons. If a provided food portion is too large there is waste, both of the food and economic in terms of expenditures. On the other hand, if the provided portion is too small the chance for customer dissatisfaction is increased. Compounding the problem is the fact that food products are, by their nature, degradable. Purchasing too much of a food product and not having the customers to purchase and consume it can be devastating to a merchant. Since many merchants in the food service industry purchase their food products in bulk, portioning the food product becomes critical. Where they can, merchant utilize food product dispensers to inject a certain amount of control over the handling and serving of their food products. Indeed, one of the primary advantages of a food dispenser is its ability to provide added control over the portioning of a food product over manual portioning, especially from a bulk container. Indeed, a food dispenser is capable of extruding, spraying, or feeding out a food substance in a desired quantity or for a desired time, whereas manual portioning involves a great deal of inconsistencies from one portion to another and is very subjective.

Dispensable food products generally fall into three broad categories: 1) liquid food products, 2) dry food products, and 3) solid food products, obviously with the type of food dispenser used depending upon the type of food product to be dispensed. The term "solid" in the context of solid food products refers to those types of food products that are not a pure solid in the literal sense as one having rigid characteristics. Instead, a solid food product may be considered more like a semi-solid, meaning that the food product comprises a degree of pliable characteristics. Numerous food substances fall within this "solid" category, each having different degrees of pliability, including mashed potatoes, butter, salads of various varieties (e.g., potato or macaroni salad), and desserts, such as soft ice cream, sherbert, and other solid sweets.

Despite the ability to dispense many solid food products there is one particular food product that has proven unworkable to dispense—prefrozen hard ice cream. While soft ice cream dispensers have been in use for years, there has not been a sufficient system devised that can effectively dispense hard ice cream. As such, merchants are forced to resort to manual portioning and serving of this popular and frequently served dessert, thus being subject to the many deficiencies or shortcomings that are associated with the manual serving of any food product, especially one stored in bulk. Indeed, any individual who has ever manually served hard ice cream is familiar with this method. Basically, it involves removing the frozen hard ice cream container from the freezer and placing it in a holding bin of some sort. To remove a portion of the hard ice cream, the individual must jam some type of object into the ice cream and exert a considerable amount of force to break away and lift a portion of the hard ice cream from the container, wherein it is then placed onto a serving dish or onto a cone. A convenient tool for scooping hard ice cream from its container in this fashion is commonly known as an ice cream scoop.

A typical ice cream scoop consists of a hemispherical head constructed of rigid material having generally acute edges allowing it to be more easily physically forced into and through the hard ice cream so as to dig out a corresponding scoop-shaped portion of ice cream. Depending upon the consistency, the density, and the frozen temperature of the ice cream, various degrees of manual forces will be needed in order to force the ice cream scoop into and through the ice cream. Some forms of ice cream scoops even include a special curved scraper that, when actuated, traces the surface of the scoop to physically scrape the ice cream free from the inside surface of the scoop and letting the individual dispose of the retrieved ice cream.

There are numerous problems associated with the manual method of scooping or dispensing hard ice cream. These problems are particularly magnified for the commercial ice cream merchant who specializes in serving hard ice cream on a frequent basis to his customers and who provides a wide variety of flavors from which his customers may choose. Such a vendor typically maintains at least one large horizontal freezer compartment inside of which the various flavors of hard ice cream are kept in their respective containers. When a customer desires a particular flavor, the merchant must locate this flavor within his freezer compartment, open the door of the freezer (if the door is not already open), bend over, and manually scoop the desired flavor of ice cream from its container where it may then be served in the desired manner. As manual scooping of the ice cream is required, there must be sufficient space to maneuver the ice cream scoop (or other similar removal device). Manually scooping of hard ice cream does not allow the user to simply reach in and vertically retrieve a scoop of ice cream. Instead, there is often required a great amount of lateral pushing or pulling of the ice cream scoop to force the ice cream scoop through the hard ice cream to obtain an adequate quantity of ice cream. Therefore, for the commercial merchant, all of the containers of the various flavors of ice cream are positioned in open cabinets, evenly spaced, and with the lids of the containers completely removed, thus providing the most accessibility. Moreover, manual serving is very inefficient as it takes time and effort to obtain a single scoop of ice cream.

A significant problem associated with manual serving of hard ice cream is that it is labor intensive, especially if done on a frequent basis. Indeed, manual scooping of ice cream can cause serious fatigue to an individual as a result of the constant leaning or bending over, and physical exertion. This constant bending over can adversely affect the back, leg, and arm muscles of the individual. The problem is exacerbated if the ice cream is extremely hard. The net result is that the productivity of the ice cream scooper drops off rapidly.

As briefly discussed above, another problem associated with the manual serving of hard ice cream is portioning to maintain an appropriate balance between product purchase and product consumption. Because manual serving is so subjective, the product amount in one scoop may significantly vary from that in another scoop and from employee to employee. Thus, it requires owners and managers to be cognizant of the scoops that are being served by each employee. If the merchant is desirous to maintain as even a balance as possible between product purchased and product served, a minimum amount of training is required for each employee, as well as continued oversight.

Maintaining sanitary conditions is also a problem associated with the manual scooping of hard ice cream. It is not uncommon to find the same ice cream scoop being used by several different employees in several different containers of ice cream. In addition, as the containers are fully open, various foreign objects (e.g., hair, dust, clothing, etc.) may find their way into the containers. Still further, it is not uncommon for the hands or portion of the arms of the individual to come in contact with the ice cream. All of these, and others, contribute to unsanitary and unsightly conditions.

From an energy standpoint, the cabinets housing the open containers of ice cream are often left open or are at least very frequently opened, thus causing the freezer within the cabinet to work much harder to maintain the temperature necessary to keep the ice cream in a properly frozen state. Because of often extreme temperature fluctuations, the consistency of the ice cream through the container becomes disrupted. This can lead to oxidation of the ice cream along the top and edges of the container requiring these portions to be discarded and wasted.

In light of the above-identified problems, there has been a long felt need for a suitable hard ice cream dispenser capable of quickly, efficiently, and sanitarily, dispensing a controlled unit of hard ice cream to a customer, thus alleviating many, if not all, of the problems discussed above. Efforts have tried and failed. Unlike soft ice cream dispensers that have been largely successful in dispensing soft ice cream, hard ice cream is a much different product. The need for such dispenser is even more apparent when considering, to many, hard ice cream is a much more preferred product. Indeed, hard ice cream is generally of a superior quality and is available in a much broader spectrum of flavors. However, soft ice cream, because of its consistency and because it falls under the category of a "soft" food product, is easily dispensable, thus contributing to its popularity and accessibility to consumers.

To dispense hard ice cream, several factors must be considered. First, the temperature of the ice cream product is important. Because of the consistency of hard ice cream from flavor to flavor and/or from type to type, there may be a significant temperature differential existing between the product temperature and the ambient temperature in the freezer in which the ice cream is stored. In order to obtain a proper flow of hard ice cream, while maintaining a consistent and appropriately served product, the product temperature must be monitored and controlled for each different flavor and/or type, not to exceed a given predetermined and identified range. Therefore, it becomes important to not only provide a temperature monitoring device for the ambient freezer, but also one capable of monitoring the product temperature. The second factor to consider is product overrun. Overrun may be defined as the percentage or amount of air present within the ice cream and is important as it contributes to the compressibility of the product and also to the taste of the ice cream. Without a percentage of air, the ice cream would not be as palatable. In addition, a higher percentage of air means less product and more profit as ice cream is sold by the volume and not the weight. As such, the overrun amount can vary from ice cream to ice cream and from flavor to flavor. From the overrun amount, the percentage of air may be calculated. Overrun divided by 2 equals the percentage of air present within the product. For example, if an ice cream comprises 80% overrun, there is 40% air and 60% product. An overrun of 120% equals 60% air, 40% product. As can be seen, the higher the overrun, the more air in the product. The third item to consider is the viscosity of the ice cream product. Viscosity is ingredient dependent and indicates a measure of the degree to which the ice cream resists flow under an applied force. For example, yogurt is less viscous than hard ice cream, thus flowing easier under pressure.

Prior related hard ice cream dispensers have failed for several reasons. First, prior related hard ice cream dispensers failed to support the ice cream container both laterally and along its longitudinal axis. As the plunger would travel through the ice cream container the pressure exerted by the plunger on the paper walls of the ice cream container would cause the walls to fail. In addition, the scoop used to dispense the ice cream was operated outside the nozzle, thus the ice cream had to travel about a tube or other enclosure from the nozzle into the scoop. This created difficulty in achieving consistent and even dispensing as often times the scoop would not fill completely or properly.

SUMMARY OF THE INVENTION

In light of the problems and deficiencies inherent in the prior art, the present invention seeks to overcome these by providing a hard ice cream dispenser capable of delivering a specific portion of ice cream in an efficient, simple manner.

Therefore, it is an object of some of the exemplary embodiments of the present invention to provide a hard ice cream dispenser that overcomes the deficiencies of prior related ice cream dispensers.

It is another object of some of the exemplary embodiments of the present invention to enable merchants to serve hard ice cream from a dispenser, thus improving the economic and physical conditions surrounding the serving of hard ice cream.

It is still another object of some of the exemplary embodiments of the present invention to increase the accessibility, sale, and popularity of hard ice cream.

It is a further object of some of the exemplary embodiments of the present invention to provide an ice cream dispensing system that regulates the portions served, thus allowing merchants to optimize the quantity of ice cream purchased with the quantity of ice cream consumed.

It is still a further object of some of the exemplary embodiments of the present invention to provide a commercial hard ice cream dispenser that allows the ice cream (or similar food) to be dispensed without removing it from its commercial containers.

It is still a further object of some of the exemplary embodiments of the present invention to provide a food dispensing system that efficiently uses available space and, at the same time, provides for the dispensing of a large variety of types and flavors of ice cream.

It is still a further object of some of the exemplary embodiments of the present invention to provide a dispensing apparatus for dispensing hard ice cream that is clean and sanitary.

It is still a further object of some of the exemplary embodiments of the present invention to provide a dispensing system that eliminates the effort, fatigue, and frustration inherent in manual serving methods.

It is still a further object of some of the exemplary embodiments of the present invention to provide an ice cream dispenser that is automatic in operation.

Although several objects of some of the various exemplary embodiments have been specifically recited herein, these should not be construed as limiting the scope of the present invention in any way. Indeed, it is contemplated that each of the various exemplary embodiments comprises other objects that are not specifically recited herein. These other objects will be apparent to and appreciated by one of ordinary skill in the art upon practicing the invention as taught and described herein.

To achieve the foregoing objects, and in accordance with the invention as embodied and broadly described herein, the present invention features a hard ice cream dispenser comprising: (a) a housing support structure; (b) a drive assembly coupled to and supported by the housing, wherein the drive assembly comprises a plunger drive means for displacing a plunger; (c) a sleeve supportable within the housing and configured to receive an inverted container of hard ice cream therein, wherein the sleeve provides lateral and longitudinal support to the ice cream container as the plunger travels through the container; (d) a nozzle removably coupled to an end of the support sleeve so as to be in fluid communication with the container of ice cream, wherein the nozzle comprises a spout for controlling the volume and cross-sectional size of dispensed ice cream; and (e) a plunger supported within the housing and removably coupled to the plunger drive means, wherein the plunger functions to displace the ice cream from the container, into and through the nozzle, and out the spout.

In one exemplary embodiment, the housing comprises a frame-like configuration that allows the ice cream dispenser to be used as a stand alone unit or in a modular compartment as part of a freezer unit.

In one exemplary embodiment, the drive assembly comprises a motor configured to drive the plunger drive means, which are two ball screws, each attached to the plunger, via a transfer assembly comprising a plurality of pulleys and a timing belt. In another exemplary embodiment, the drive assembly may comprise a single plunger drive means coupled to the plunger. In essence, the present invention drive means may comprise any configuration or assembly known in the art for driving the plunger as intended herein.

In one exemplary embodiment, the sleeve comprises an open-end thin-wall cylinder made of an insulating material that comprises a lip formed in a pressure end (the end facing and initially receiving the plunger) configured to receive and support an upper end of an ice cream container (the ice cream container being inverted within the sleeve). The sleeve is also configured to mate with the nozzle, which receives and retains the lower rim of the ice cream container.

In one exemplary embodiment, the nozzle comprises a substantially conical shaped member having an inlet in fluid connection with the sleeve and a spout in an opposing end. The nozzle further comprises a channel formed in a collar portion for receiving the lower rim of an ice cream container as it is inverted within the sleeve. The nozzle may comprise a uniform inner surface, or a plurality of varying surface areas designed to facilitate and also control flow through the nozzle.

In one exemplary embodiment, the plunger comprises a dynamic seal configured to flex from a relaxed, non-energized state to an energized state at a pre-determined compression pressure, wherein in an energized state the dynamic seal contacts an inside surface of a wall of the ice cream container. In another exemplary embodiment, the plunger comprises a static seal that is configured to contact the inside surface of the wall of the ice cream container.

The hard ice cream dispenser further comprises a pressure regulation system operable with the drive assembly for regulating the forward displacement of the plunger and for providing automatic dispensing of the ice cream.

The hard ice cream dispenser of further comprises an ice cream scoop pivotally and removably attached to the nozzle, wherein the spout is configured to align and interact with a scoop portion of the ice cream scoop such that ice cream dispensed from the spout is captured by the scoop. Thus it can be stated that the scoop portion of the ice cream scoop operates within the spout area of the nozzle. Subsequent actuation of the ice cream scoop functions to cause a rim portion of the scoop to cut through the ice cream still contained within the nozzle, thus forming a spherical scoop of ice cream. The ice cream scoop further comprises a cam assembly for actuating a blade that travels along the inside surface of the scoop to dispense the spherical scoop of ice cream in a consistent and efficient manner.

The present invention further features a method of dispensing hard ice cream (or other similar food products) comprising obtaining a container of ice cream; removing the lid and bottom portions from the container to achieve an open-end cylinder of ice cream; loading the container into a support sleeve in an inverted manner so that an upper portion of the container engages and rests upon a container support formed within a pressure end portion of the sleeve and a lower end extends a pre-determined distance above a rim of the sleeve; coupling a nozzle to the sleeve, wherein the nozzle receives the lower end portion of the container within a channel formed therein, the nozzle and the sleeve functioning to provide both lateral and longitudinal support to the container; supporting the coupled sleeve and the nozzle within a hard ice cream dispenser housing; activating a drive assembly to displace a plunger having a dynamic seal contained therein; displacing the plunger into the ice cream, thus energizing the dynamic seal of the plunger to contact and seal against a wall of the container; and dispensing a pre-determined amount of the ice cream from the spout of the nozzle by advancing the plunger a pre-determined distance.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 8-B illustrates a detailed side view of the exemplary plunger of FIG. 6, and specifically the dynamic seal in its extended, energized state as contained within and interacting with the ice cream container;

FIG. 10-B illustrates an exploded perspective view of the various components of the exemplary ice cream container retaining assembly of FIG. 10-A;

FIG. 11-B illustrates a cross-sectional view of the nozzle component of FIG. 11-A;

FIG. 11-C illustrates a cross-sectional view of another exemplary embodiment of the nozzle component of FIG. 11-A taken along lines A—A depicted in FIG. 11-A, wherein the inside surface of the nozzle comprises a non-uniform configuration comprising several oriented surface areas or segments integrally formed together;

FIG. 11-D illustrates a detailed cross-sectional view of the ice cream container rim receiving and retaining channel of the exemplary nozzle shown in FIG. 11-B;

FIG. 12-B illustrates a cut-away cross-sectional view of the ice cream container as supported both laterally and longitudinally by the sleeve and the nozzle;

DETAILED DESCRIPTION OF EXEMPLARY EMBODIMENTS

Figure 1:
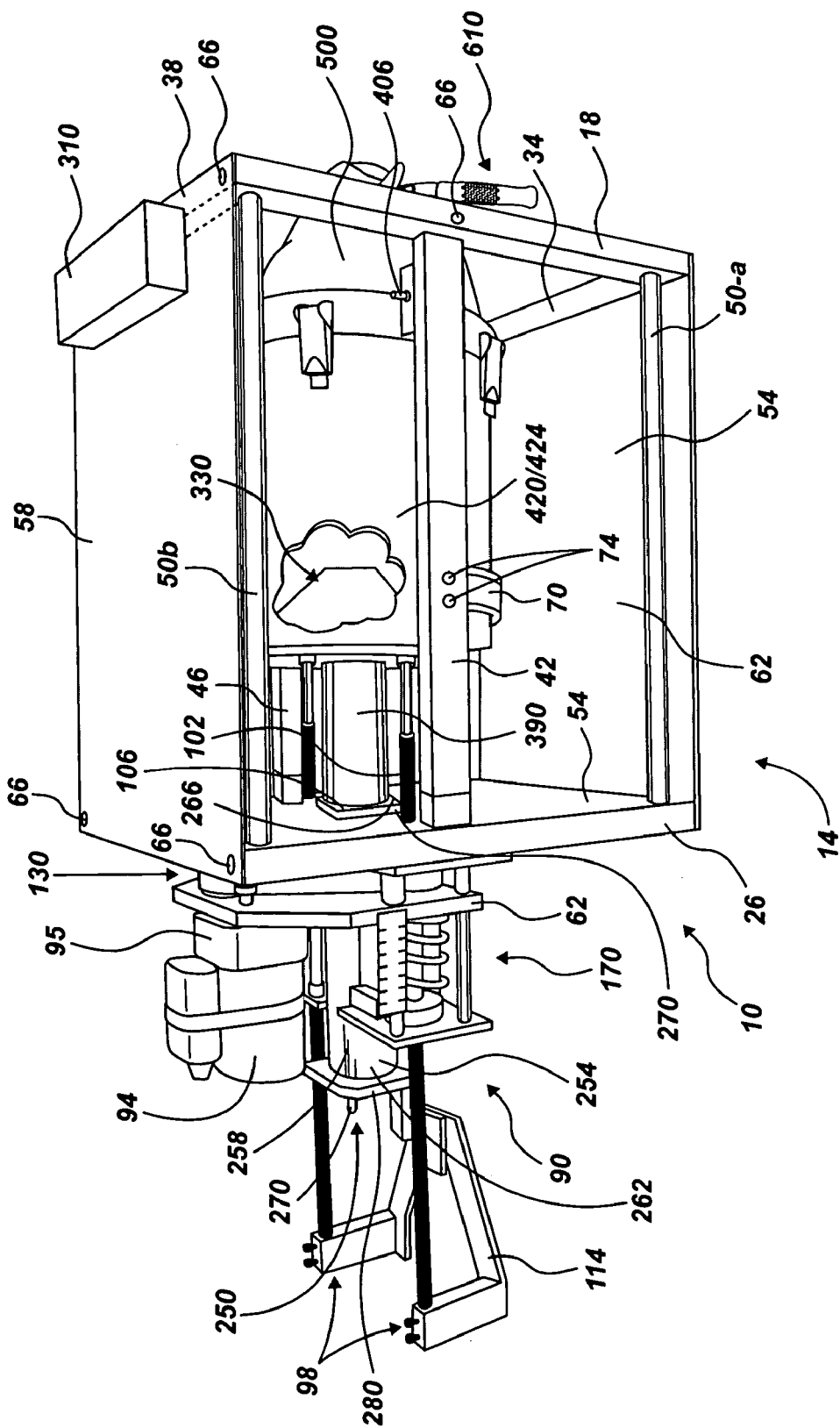
FIG. 1 illustrates a perspective view of the present invention hard ice cream dispenser according to one exemplary embodiment of the present invention.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 17, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for dispensing hard ice cream from a standard ice cream container using an automatic hard ice cream dispenser. As indicated above, dispensing of hard ice cream has heretofore proven unworkable. However, advantageously a food dispensing apparatus is realized herein that is ideally suited for dispensing hard ice cream, sherbert, or similar desert-type foods, in an efficient and sanitary manner. Not only is the amount of ice cream or other food per serving controlled in a uniform fashion, but the dispenser allows consistent, proportional spherical-shaped balls to be quickly served. Moreover, the system is compatible with present commercial containers containing ice cream. These containers may easily be reloaded into the dispenser when needed. Furthermore, a modular freezer system is provided so as to be able to house several dispensers within a single unit, thus eliminating the need for multiple freezers. Also, the horizontal design in many of the described exemplary embodiments conserves space in that many of the different and types of ice cream can be stacked vertically rather than being horizontally spread out over a given floor area as is commonly found in current commercial establishments. The benefit of this is not only to conserve space, but it more efficiently utilizes the time of the server serving the ice cream in that the desired type or flavor is quickly located and dispensed.

Also, the system is especially effective for displaying the type or flavor of ice cream available in each individual dispensing unit. A customer desiring to purchase a scoop or scoops of ice cream (or other food) merely has to scan the wall where the dispensing system is placed and from the indicators provided on each individual dispensing unit (or the door enclosing the dispenser) make his or her selection.

Once the selection is made the server simply approaches the selected unit, opens the door, places a dish or cone below the dispensing device, actuates the scoop device to eject the scoop of ice cream already formed therein, and presents the dispensed scoop to the customer. This method not only reduces the skill, fatigue, and frustration that is often attendant using prior related methods for dispensing hard ice cream, but it is an efficient and sanitary way of handling the ice cream in a commercial environment. The various aspects of the invention are discussed in greater detail below, as well as a description of the method of operation of the system.

For convenience of the reader, the following more detailed description is divided into multiple sections. The first section pertains to the structure of the hard ice cream dispenser and the inter-relation between each of the component parts. The second section pertains to the theories of operation of the various dispenser embodiments, as well as various methods of operating the dispenser and for dispensing hard ice cream or other similar food products. These sections are not to be construed as limiting in any way.

Hard Ice Cream Dispensing System

Referring now to FIG. 1, shown is one exemplary embodiment of the present invention hard ice cream dispenser 10 (hereinafter "dispenser 10"). Dispenser 10 comprises a housing 14 that functions to support each of the component parts of dispenser 10 discussed herein. Dispenser 10 may be operated and used as a stand-alone unit or system, or dispenser 10, and particularly housing 14, may comprise a modular attribute with structural elements configured to fit within a freezer unit as one of several similar and independent dispensers modules. The concept of a modular freezer unit is discussed in greater detail below.

Housing 14 is shown comprising a box-like structure with various coverings on select or all sides, depending upon what is desired. Housing 14 comprises an internal frame assembly consisting of vertical and horizontal support members. In each corner of housing 14 there is situated a vertical support structure, namely first and second front supports 18 and 22 and first and second rear supports 26 and 30. Each of these vertical support structures extends between top portion 58 and bottom portion 62. Their primary function is to provide vertical structural support to housing 14, but they function to provide a degree of lateral and torsional support as well. The vertical supports may comprise any appropriate height and are typically constructed of steel or any other rigid material capable of withstanding the various forces acting upon them. Extending laterally between first and second front supports 18 and 22 are first and second front lateral support members 34 and 38. Likewise, extending laterally between first and second rear vertical supports 26 and 30 may be first and second rear lateral support members (not shown). This frame configuration functions as the main internal support structure of housing 14. Additional support members may also be included, such as stabilizers 50-*a*, 50-*b*, 50-*c* (not shown, but existing opposite stabilizers 50-*a* and 50-*b*, respectively). Any number of such stabilizers may be used and positioned as needed to give added structural support to housing 14 and dispenser 10.

Housing 14 further comprises top portion 58 and bottom portion 62 positioned above and below vertical support members 18, 22, 26, and 30 as shown. Housing 14 further comprises back wall 54. Back wall 54 is a solid plate extending between rear vertical supports 26 and 30 and between top portion 58 and bottom portion 62. Back wall 54 serves as a separator separating those components of dispenser 10 in contact with or in the vicinity of the ice cream from the motor and other parts of the drive assembly 90. This helps to maintain a clean and sterile environment within housing 14 for the ice cream and allows users of the dispenser to be able to work with the ice cream and its container without exposure to the motor and other components of the drive assembly. In addition, back wall 54 provides a point of attachment for various components of the drive assembly as discussed below. Optionally, housing 14 may also comprise various side walls and a front wall to completely enclose housing 14. Each of the above-described components attach together using any known attachment means. In the exemplary embodiment shown, the attachment means comprises a common bolt connection.

It should be noted that the housing structure depicted in each of the Figures is representative of merely one exemplary embodiment. Indeed, housing 14 may comprise other shapes, designs, or configurations that are each capable of supporting the various components of dispenser 10. For example, housing 14 may comprise an enclosed structure that is not open to the atmosphere as the exemplary embodiment shown. Or, housing 14 may comprise a more refined and aesthetically pleasing structure. Moreover, housing 14 may comprise any one of several modular shapes, designs, or configurations capable of allowing dispenser 10 to function as one of several similar dispensing modules within a freezer unit. In any event, the primary purpose of housing 14 is to house and support each of the dispensing components discussed herein, and to modularly fit within a freezer unit, if so desired.

FIG. 1 further illustrates first and second retaining rails 42 and 46 extending horizontally and longitudinally down each side of housing 14 and connecting to front and rear vertical supports, respectively. Retaining rails 42 and 46 are positioned at or near and extend from the midpoint of the vertical support members and function to support the ice cream container retaining assembly 420 (consisting of sleeve 424 configured to receive and support an ice cream container 450 therein) (hereinafter "retaining assembly") in an elevated or suspended and substantially horizontal position within housing 14. The particulars regarding the attachment of retaining assembly 420 are shown in greater detail in FIGS. 13 and 14 discussed below.

In addition to receiving and supporting retaining assembly 420 in an elevated or suspended position, retaining rails 42 and 46 also function as the primary means for fixing retaining assembly 420 in a fixed position once properly inserted or installed. Stated differently, as drive means 90 drives the plunger assembly (namely, plunger 330) into the ice cream contained within retaining assembly 420, a substantial amount of force is exerted upon retaining assembly 420, and particularly nozzle 500. Specifically, plunger 330 has a tendency to push or drive retaining assembly 420 forward. However, in order for dispenser 10 to operate correctly, retaining assembly 420 must remain fixed within housing 14. This is done by properly attaching or coupling retaining assembly 420 to nozzle 500, wherein nozzle 500 is secured to retaining rails 42 and 46. As such, when drive assembly 90 is actuated, thus driving plunger 330 into retaining assembly 420 and the ice cream contained therein, since nozzle 500 is fixed as a result of it being coupled to the retaining rails, a substantial tension force is resultantly generated within each of retaining rails 42 and 46. This tension force is created as plunger 330 exerts a driving force within the nozzle, which force is naturally transferred to retaining rails 42 and 46 as a result of their coupled relationship. Therefore, in order to resist this force and to ensure retaining assembly 420 maintains a proper position within housing 14, retaining rails 42 and 46 are preferably made of a durable steel or metal alloy material capable of bearing the repeated tension forces induced within them as a result of the forces exerted upon nozzle 500 by the plunger 330. Stabilizers 50 further function as tension bars that help to bear portions of the generated tension forces. Moreover, housing 14 functions to bear some of the applied loads as each of stabilizers 50 and retaining rails 42 and 46 are coupled to various components of housing 14, namely vertical supports 18, 22, 26, and 30. FIG. 1 shows retaining rails 42 and 46 having a rectangular shape or rectangular cross-section that matches the cross-section of coupling means 582 of nozzle 500. Of course, these retaining rails may comprise any shaped cross-section.

Also assisting in the suspension of retaining assembly 420 within housing 14 is arm 70. Arm 70 comprises an element of curvature and extends laterally between first and second retaining rails 42 and 46 and is positioned at a pre-determined location along retaining rails 42 and 46 so as to properly support sleeve 424. Arm 70 may attach to retaining rails 42 and 46 using any known attachment means, such as thumb screws 74 or the bolt connection 66 discussed above. The radius of curvature of arm 70 is complimentary to that of sleeve 424 so as to be able receive sleeve 424 therein such that arm 70 and sleeve 424 fit together in a nesting relationship.

FIG. 1 also illustrates an exemplary drive assembly 90 as coupled to housing 14 and configured to drive plunger 330. In the embodiment shown in FIGS. 1, and 3–4, drive assembly 90 comprises a motor 94 operably connected to a transfer assembly 130 for driving first and second ball screws 102 and 106, wherein motor 94 and transfer assembly 130 are each coupled to and supported by a movable compression plate 182 that is in turn slidably coupled to and supported by several support rods 194 on one side and several support rods 198 on an opposing side. Rods 194 and 198 are rigid rods that are securely coupled to and extend from back wall 54 and dorsal wall plate 202. Motor 94 comprises and causes to rotate a drive shaft 96 that is operably connected and functions with at least one member or component of transfer assembly 130. Motor 94 may comprise any type of motor commonly known in the art and capable of performing the intended function described herein, but is shown as comprising a ⅙ H.P. bi-directional motor that runs at approximately 30 r.p.m. The motor may also comprise a variable speed motor commonly known in the art.

Transfer assembly 130 functions to transfer the power from motor 94 to the plunger driving means 98 that effectively drives plunger 330. In one aspect, transfer assembly 130 may comprise a series of timing belt pulleys rotatably and securely coupled to movable compression plate 182 and linked together by a timing belt 138 held in tension by each of timing belt pulleys 134. Specifically, FIG. 1 illustrates transfer assembly 130 comprising a series of timing belt pulleys, namely first timing belt pulley 134-*a*, second timing belt pulley 134-*b*, and third timing belt pulley 134-*c*. First timing belt pulley 134-*a* is operably and securely connected to drive shaft 96 such that drive shaft 96 is allowed to exert a substantial amount of rotational force within first timing belt pulley 134-*a* preferably without first timing belt pulley 134-*a* slipping about drive shaft 96. Although not shown, first timing belt pulley 134-*a* is coupled to a bearing designed to fit within its interior, wherein the bearing is configured to securely attach timing belt pulley 134-*a* to drive shaft 96. Second timing belt pulley 134-*b* is operably and rotatably connected to first ball screw 102. Third timing belt pulley 134-*c* is operably and rotatably connected to second ball screw 106. First and second ball screws 102 and 106 are exemplary of one type of means for driving plunger 330.

Similar to first timing belt pulley 134-*a*, second and third timing belt pulleys 134-*b* and 134-*c* are each coupled to a bearing fitted within an interior of each respective timing belt pulley defined by an inner surface, wherein these bearings each further comprise a threaded inner surface configured to match and mate with the threads 110 of first and second ball screws 102 and 106. As such, second and third timing belt pulleys 134-*b* and 134-*c* are essentially threaded onto first and second ball screws 102 and 106 via their contained bearings. In this manner first and second timing belt pulleys 134-*b* and 134-*c* are rotatably coupled to first and second ball screws 102 and 106, in addition to their being rotatably coupled to movable compression plate 182.

In operation, as motor 94 is actuated, drive shaft 96 is caused to rotate. Since drive shaft 96 is coupled to first timing belt pulley 134-*a*, first timing belt pulley 134-*a* rotates. Rotation of first timing belt pulley 134-*a* subsequently causes second and third timing belt pulleys 134-*b* and 134-*c* to rotate as each of these timing belt pulleys is connected together by timing belt 138. Therefore, motor 94 effectively drives each of timing belt pulleys 134 as a result of their interacting relationship with timing belt 138. As second and third timing belt pulleys 134-*a* and 134-*b* are caused to rotate, their contained bearings also rotate. However, since each of first, second, and third timing belt pulleys are securely and rotatably coupled to movable compression plate 182, rotation of second and third timing belt pulleys 134-*b* and 134-*c* by timing belt 138 effectively drives or causes to displace first and second ball screws 102 and 106 in a bi-directional manner. Depending upon the direction of rotation of motor 94, drive shaft 96, and timing belt 138, first and second ball screws 102 and 106 may be made to displace in a backward or forward direction.

As indicated, connecting and driving each of the timing belt pulleys 134 in transfer assembly 130 is a timing belt 138. Preferably, timing belt 138 comprises a pattern of notches or grooves 144 formed along its inner surface. Likewise, each of timing belt pulleys 134-*a*, 134-*b*, and 134-*c* comprises a complementary pattern of notches or grooves 142-*a*, 142-*b*, and 142-*c*, respectively, formed on their respective spools. The notches 142 on each of the spools of timing belt pulleys 134 are configured to receive and mate with the corresponding notches 144 on the interior of timing belt 138, such that the potential for timing belt 138 to slip or spin about the timing belt pulleys 134 is significantly reduced or eliminated. Of course, timing belt 138 may comprise various degrees of tension, thus negating the need for such notches on either of timing belt pulleys 134 or timing belt 138.

Transfer assembly 130 may further comprise one or more rollers 146. Rollers 146 also rotatably fixed to movable compression plate 182. As shown, rollers 146 are typically positioned on each side of a timing belt pulley 134 so as to leave a gap between the spool of timing belt pulley 134 and the outer perimeter surface of each of rollers 146. Timing belt 138 is inserted through this gap as shown. In addition, rollers 46 comprise an axis of rotation that is offset a given distance from the axis of rotation of timing belt pulley 134, such that rollers 146 apply a downward force to timing belt 138 once timing belt 138 is inserted in the gap created between rollers 146 and timing belt pulley 134. This downward force effectively functions to increase the surface area of timing belt 138 in contact with the spool of timing belt pulley 134, as well as to cause an identified point on timing belt 138 to remain in contact with the surface of the spool of timing belt pulley 134 an increased duration as timing belt 138 is caused to rotate, thus contributing to the efficiency of timing belt 138 with respect to timing belt pulley 134. Not all of timing belt pulleys 134 may require rollers 146.

In one exemplary embodiment, plunger drive means 98 is shown comprising first and second ball screws 102 and 106, each of substantially identical length. First and second ball screws 102 and 106 each comprise a first end 104 and a second end 108 and threaded elements 110 extending along at least a portion of their lengths. Threaded elements 110 are formed in the surface of each of ball screws 102 and 106 and are comprised of a threading configuration similar to that of the bushings inserted into those timing belt pulleys 134 designed to receive ball screws 102 and 106.

The primary function of plunger drive means 98 is to drive or displace the plunger attached at an end of drive means 98 in a bi-directional manner a pre-determined distance. Thus, when a container of ice cream is inserted into the dispensing unit and configured to receive the plunger attached to the end of drive means 98, and when the drive means is activated, the plunger displaces and the ice cream contained within the container is caused to also displace, thus eventually dispensing from the nozzle and out of the dispensing unit (e.g., onto an ice cream cone, or into a bowl or other intended dish).

As stated, in one exemplary embodiment, and as illustrated in the Figures, plunger drive means 98 comprises first and second ball screws 102 and 106 operably coupled to transfer assembly 130. Specifically, first and second ball screws 102 and 106 are shown as extending through apertures in first and second fixed spring base plates 186 and 190, respectively, movable compression plate 182, timing belt pulleys 134-*b* and 134-*c,* respectively, dorsal wall plate 202, back wall 54, and into the interior of housing 14 where ends 108 are configured to receive and couple to a plunger (not shown). As indicated above, those timing belt pulleys 134 that function to receive and drive first and second ball screws 102 and 106 each comprise threaded members that engage and operate with matching and complementary threads 110 formed on first and second ball screws 102 and 106. In one aspect timing belt pulleys 134 may comprise threaded members formed on their interior wall surfaces.

In another, preferred, aspect, timing belt pulleys 134 each comprise a threaded bearing that fits within the interior portion of timing belt pulleys 134. As the complementary threaded members are properly engaged, timing belt pulleys 134 are configured to drive and bi-directionally displace ball screws 102 and 106. Stated differently, as timing belt pulleys 134 are caused to rotate, specifically as timing belt pulleys 134-*b* and 134-*c* having first and second ball screws 102 and 106 received therein, respectively, are caused to rotate, and as the threads on each of the bushings within these timing belt pulleys are engaged with the complementary threads 110 formed on ball screws 102 and 106, each of first and second ball screws 102 and 106 are caused to displace or advance. As timing belt pulleys 134-*b* and 134-*c* rotate, ball screws 102 and 106 displace in a forward or backward direction depending upon the direction of rotation of transfer assembly 130, and particularly timing belt pulleys 134, by motor 94. Displacement occurs because ball screws 102 and 106 are effectively threaded into timing belt pulleys 134-*b* and 134-*c,* respectively, and since timing belt pulleys 134-*b* and 134-*c,* although allowed to rotate, are supported by structural components configured to allow such operation of ball screws 102 and 106. As such, to displace ball screws 102 and 106, and hence the attached plunger, in a forward direction (e.g., toward the front of housing 14), motor 94 is caused to rotate transfer assembly 130 accordingly. Likewise, to displace ball screws 102 and 106 and the attached plunger in a backward direction, the rotational direction of motor 94 is reversed, thus reversing the rotation of transfer assembly 130.

The number of threads per given distance (e.g., number of threads per inch) on each of first and second ball screws 102 and 106 may be varied to alter the speed at which the plunger displaces that given distance. As each of the ball screws are operably engaged with and driven by the attached timing belt pulleys, for each rotation of the timing belt pulley the ball screw moves a given distance. Thus, for each rotation of the timing belt pulley operably supporting the ball screw, the resulting displacement distance of the plunger may be varied by varying the number of threads in a given distance on the ball screws. For instance, if the plunger is displacing too great a distance with respect to the rotation of the timing belt pulleys engaging the ball screws, the number of threads per given distance may be increased. On the other hand, if the plunger is displacing too little a distance with respect to the rotation of the timing belt pulleys engaging the ball screws, the number of threads per given distance may be decreased. Such techniques are commonly known in the art.

Plunger drive means 98 must be sufficiently strong to apply and withstand the necessary compression forces needed to displace the hard ice cream from its container and to force the dispensing of the ice cream out of a nozzle. Moreover, the timing belt pulleys engaging each of the ball screws must also be sufficiently strong in order to apply the driving forces needed to displace the plunger against the ice cream. The particular size and configuration of ball screws, their thread count, the size and configuration of drive timing belt pulleys, and the needed means for securely attaching these components within a workable dispenser unit will be apparent or easily determinable to one skilled in the art.

At opposing ends 108, first and second ball screws 102 and 106 are shown having attached thereto, via attachment means, namely screws 118, a positional locator 114. Positional locator 114 comprises a u-shaped member having a trigger plate 122 thereon for actuating a plurality of strategically placed indicator switches (not shown) situated on a switch board 126. Because it is attached to ends 104, positional locator 114 is designed to displace with first and second ball screws 102 and 106. As it does, the strategically positioned or placed indicator switches (micro switches) are contacted by trigger plate 122 located on one or more of the fixed components of drive assembly 90, pressure regulation system 170, etc. Each switch electrically controls a gauge 314 that, when triggered, indicates the amount of ice cream contents remaining in the ice cream container. Thus, depending upon the position of the plunger, a different indicator switch 216 is triggered. Any number of indicator switches 216 may be used, depending upon the degree of signaling accuracy desired. This concept is discussed in greater detail below.

With reference to FIGS. 1–4, the present invention hard ice cream dispenser 10 further comprises a plunger guide system 250 that functions to both provide support to the plunger and also to correctly align the plunger during its displacement in operation of dispenser 10. Plunger guide system 250 comprises a support casing 254 consisting of an open end, elongate, thin-walled cylinder 258 having first and second flanged ends 262 and 266. Second flanged end 266 is inserted through an aperture formed in back wall 54 of housing 14 and couples to an inside surface of back wall 54 using any known attachment means, such as bolt connection 270, wherein elongate cylinder 258 extends therefrom to first flanged end 262 located at a distal location with respect to back wall 54. As such, a tube or port having a pre-determined diameter is essentially created through back wall 54 extending the length of casing 254. Inserted through this port created by casing 254 is a stabilizer core 276. Stabilizer core 276 comprises a solid cylindrical body having a diameter less than the inside diameter of casing 254 such that, when inserted, a stabilizer core 276 effectively creates an annular gap between stabilizer core 276 and casing 254, defined by the outer surface of stabilizer core 276 and the inside surface of casing 254. Stabilizer core 276 comprises a flanged end 280 that couples to first flanged end 262 of casing 254 and an engaging end that protrudes a substantial distance from back wall 54 into housing 14. In its attached position, stabilizer core 276 exists in a coaxial relationship with casing 254, thus creating a uniform annular gap between the two components. Stabilizer core 276 further comprises an engaging end 284 configured to receive and slidably engage a component or a portion of the plunger. As will be more fully discussed below, the plunger comprises a support tube coupled thereto that consists of an open end, thin-walled cylinder having an outer diameter slightly less than the inside diameter of casing 254, a wall thickness slightly less than the annular gap thickness created between casing 254 and stabilizer core 276, and an inner diameter slightly greater than the outer diameter of stabilizer core 276. As such, the support tube of the plunger is configured to receive and fit over stabilizer 276 and also to be inserted into casing 254, thereby supporting the plunger in a cantilevered manner within housing 14. The length of stabilizer core 276, and particularly the distance engaging end 284 extends from back wall 54 of housing 14, must be such that the support tube of the plunger is still properly engaged with stabilizer core 276 when the plunger is in its fully extended position. Indeed, as the plunger is displaced back and forth, its support tube will slide back and forth about stabilizer core 276 and within casing 254.

Figure 4:
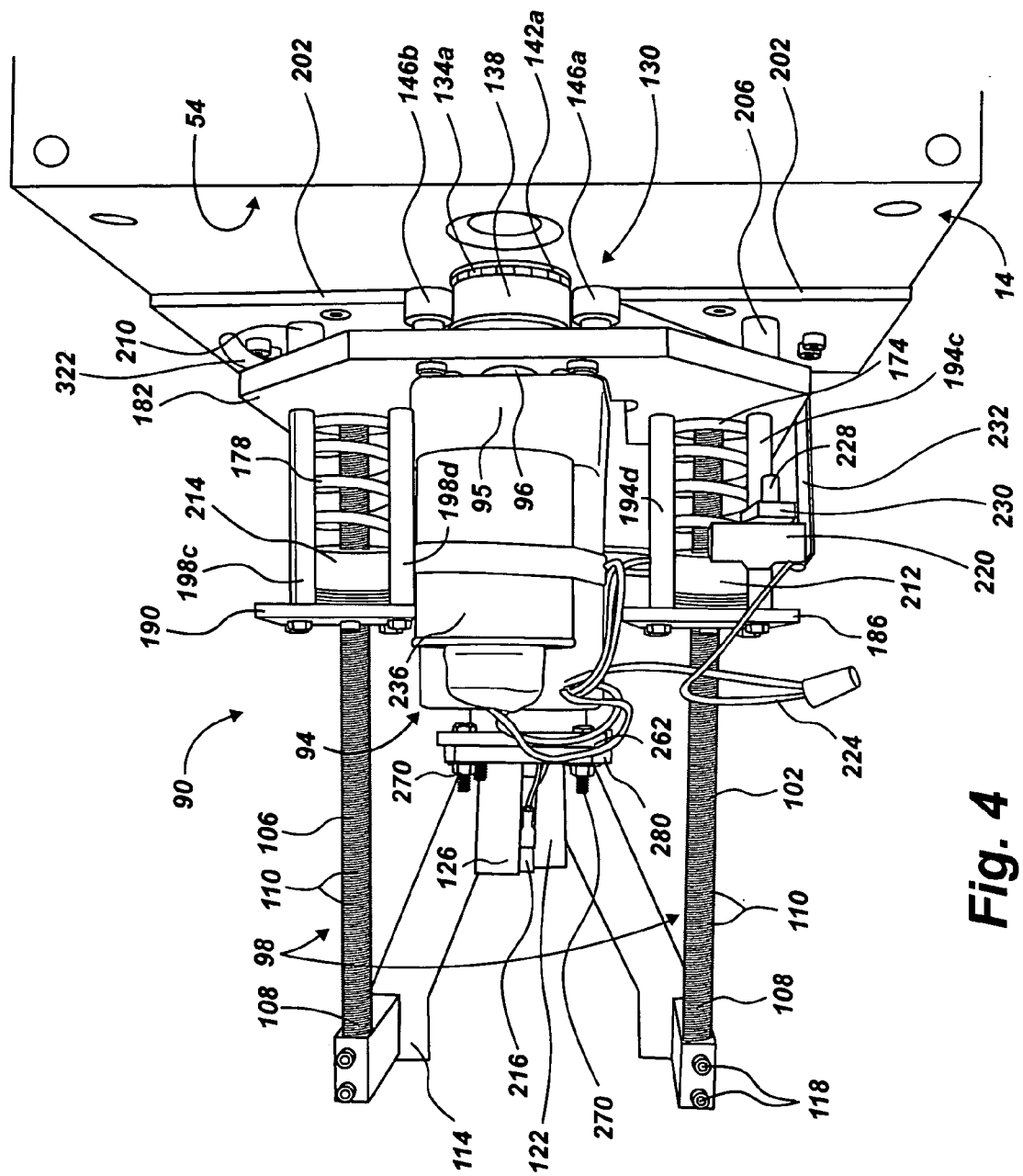
FIG. 4 illustrates a top view of the exemplary drive assembly and pressure regulation assembly shown in FIG. 3.
Figure 5:
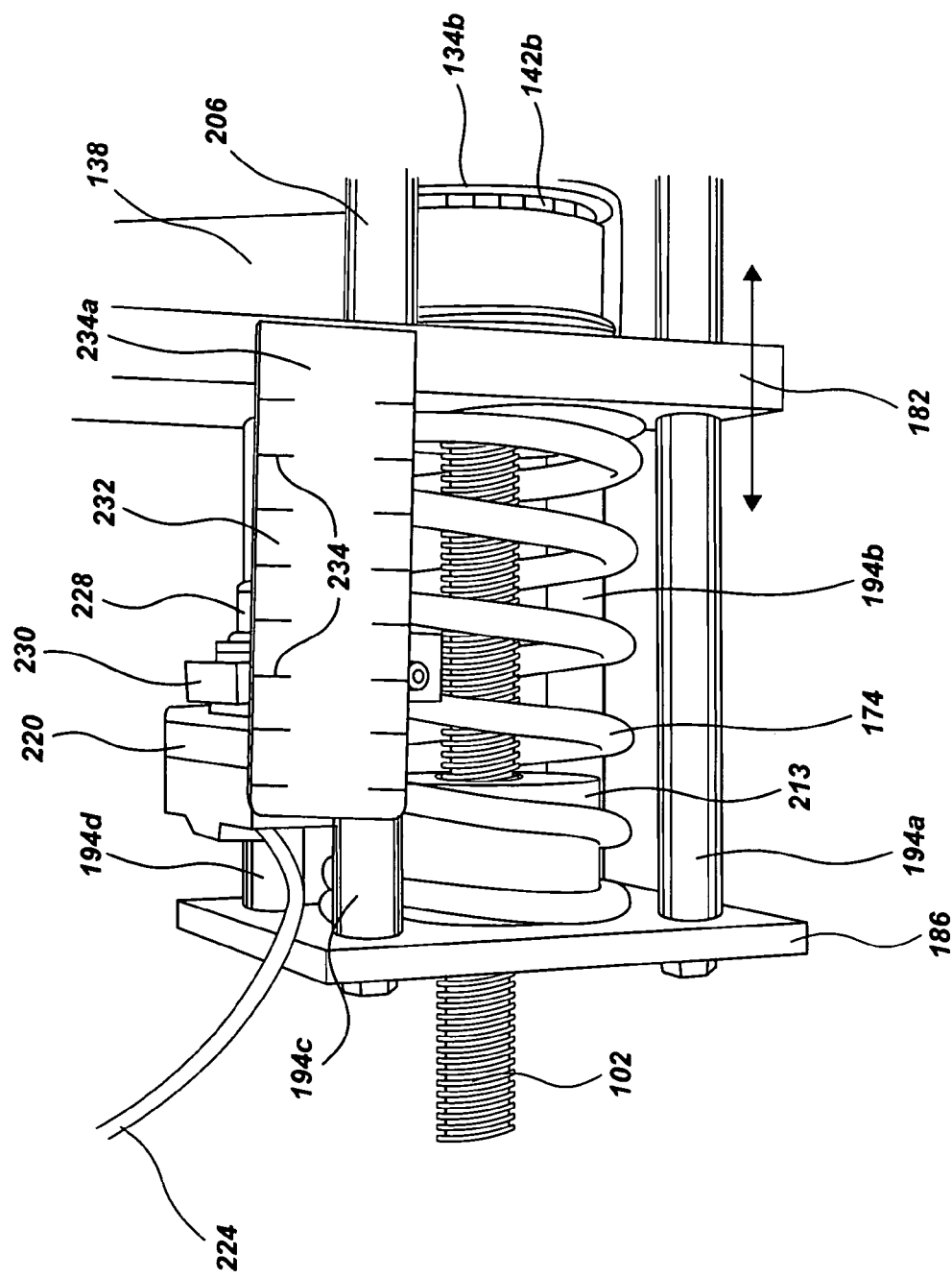
FIG. 5 illustrates a detailed side view of the exemplary pressure regulation assembly that is operable with the exemplary drive assembly of FIG. 3.

With reference to FIGS. 4 and 5, the present invention hard ice cream dispenser 10 further comprises a pressure regulation system 170. In the embodiment shown, pressure regulation system 170 operates with drive assembly 90 to control the pressure exerted by the drive assembly 90, and particularly first and second ball screws 102 and 106 and the attached plunger on the ice cream. Pressure regulation system 170 comprises a biasing component, shown as first and second compression springs 174 and 178. First compression spring 174 is supported between a fixed spring base plate 186 on one end and a surface of movable compression plate 182 on an opposing end. Second compression spring 178 is supported between a fixed spring base plate 190 at one end and a surface of movable compression plate 182 on an opposing end. First fixed spring base plate 186 is secured to and supported by a series of support rods 194-a, 194-b, 194-c, and 194-d, while second spring base plate 190 is secured to and supported by a series of similar support rods 198-a, 198-b, 198-c, and 198-d. Each of support rods 194 and 198 are securely attached to back wall 54, and particularly dorsal wall plate 202, at a proximate end, and extend therefrom a pre-determined and uniform distance to comprise a distal end. Fixed spring base plates 186 and 190 are securely attached at the distal ends of support rods 194 and 198 in an upright vertical position, thus providing a base for receiving and supporting one end of the compression springs.

Support rods 194-a–d are arranged in an equilateral manner about first compression spring 174, as shown, and as measured from a longitudinal axis of compression spring 174. Likewise, support rods 198-a–d are arranged in an equilateral manner about second compression spring 178, as shown, and as measured from a longitudinal axis of compression spring 178. Moreover, movable compression plate 182 comprises apertures for receiving each of these support rods, thus allowing movable compression plate 182 to slide along the support rods when compressed. In other words, movable compression plate 182 is slidably mounted to support rods 174 and 178. It should be noted that the specific configuration or number of support rods 194 and 198 is not important, nor is their positioning. Indeed, many structural configurations are possible to perform the intended function of the support rods, which is to serve as the primary structural elements supporting the components of the drive assembly 90, transfer assembly 130, and pressure regulation system 170. Thus, the configuration illustrated in the Figures is only meant to be exemplary of one embodiment. One skilled in the art will recognize similar ways to provide support to the drive assembly, as well as to allow the plunger to be driven and its exerted pressure or force regulated.

First and second compression springs 174 and 178 are positioned on opposing sides of drive assembly 90. Specifically, first and second ball screws 102 and 106 are disposed coaxially within first and second compression springs 174 and 178, respectively. However, a coaxial relationship with ball screws 102 and 106 is not necessary. Indeed, first and second compression springs 174 and 178 may be situated anywhere between movable compression plate 182 and fixed base plates 186 and 190 to perform the intended function as described herein. In addition, first and second compression springs comprise a pre-determined spring rating. The spring rating for the compression springs shown in the illustrated embodiment are 50 lbs/in. Thus, for each inch a spring is compressed, 50 lbs. of additional pressure is exerted by the springs along its longitudinal axis. Other springs with different spring ratings may be used, depending upon the desired pressure to be exerted by the plunger.

First and second compression springs 174 and 178 are preferably pre-loaded, or rather supported between movable compression plate 182 and fixed base plates 186 and 190 in an initial state of compression, thus allowing the plunger to exert a force within an initial range that is below the pre-load compression pressure before movable compression plate 182 is caused to displace. By pre-loaded it is meant the pre-determined compression pressure existing within the pressure regulation system when the movable compression plate is in its natural resting state and when there is no pressure exerted by or on the plunger. As such, since it is slidably disposed about support rods 194 and 198, movable compression plate 182 is continually biased forwards towards housing 14. A plurality of spacers or stoppers, shown as stoppers 206 and 210, supported by and extending from back wall 54 (or dorsal wall plate 202) function to receive movable compression plate 182 in its resting position and to keep it or any of the components of drive assembly 90 or transfer assembly 130 from contacting back wall 54 while the plunger is being displaced. Stoppers 206 and 210 may be made of any suitable load bearing material, and may comprise any desired length.

In the embodiment shown, first and second compression springs 174 and 178 are pre-loaded to 150 lbs., meaning compression springs 174 and 178 are compressed a distance of around three inches from their natural, uncompressed state, since they each have a spring rating of 50 lbs./in. In addition, as there are two compression springs, each preloaded to 150 lbs., the total pre-load pressure or force within the system and acting on movable compression plate 182 is 300 lbs. The effect of pre-loading first and second compression springs 174 and 178 is that the plunger may displace and exert a force having a magnitude between the range of 0 and 300 lbs. (or zero and another pre-load pressure) without causing movable compression plate 182 to displace. Up to 300 lbs. (or up to the pre-load pressure if different than 300 lbs.), the plunger may be displaced or travel in a forward direction continually exerting a resulting force without movable compression plate 182 moving. In addition, up to 300 lbs., the plunger may be displaced or travel in a backward direction immediately upon reversal of motor 94.

On the other hand, if the plunger exerts or has acting thereupon a force of 300 lbs. or greater, or in other words, if the threshold pre-load pressure within the springs is achieved and exceeded, forward movement of the plunger stops. Rather than the plunger displacing, continued forward rotation of motor 94 with compression forces at or exceeding the threshold pre-load pressure functions to cause movable compression plate 182 to displace. The displacement of movable compression plate 182 is in a backward direction pushing against or further compressing first and second compression springs 174 and 178, thus increasing the pressure exerted by the plunger (e.g., on a food item). Continued forward rotation of motor 94 causes movable compression plate 182 to continually displace backward and to further compress first and second springs 174 and 178 until one of two things happens. First, the movable compression plate may displace a pre-determined distance to a pre-determined point or location, wherein movable compression plate 182 activates a shut-off switch, shown as limit switch 220, that automatically shuts off the power and stops the forward rotation of motor 94. In the embodiment shown, movable compression plate 182 displaces until its outer surface contacts a switch actuator 228 that actuates limit switch 220. Limit switch 220 is designed to be strategically positioned so that when tripped, limit switch 220 shuts off the power to motor 94 and disables drive assembly 90 in the forward direction before too great a pressure is applied, thus causing damage to the system. Once tripped, limit switch 220 prohibits further rotation of motor 94 in the forward direction. However, motor 94 may be reversed, which effectively causes movable compression plate 182 to displace in a forward direction away from limit switch 220, assuming the pressure on the plunger is maintained, which forward displacement functions to decompress first and second compression springs 174 and 178 along the way. Although reversal of motor 94 causes movable compression plate to move in a forward direction decompressing first and second compression springs 174 and 178, reversing motor 94 will not immediately cause the plunger to move in a backward direction (again, assuming the pressure on the plunger is maintained). The plunger is only able to move backward once movable compression plate 182 is again seated against stoppers 206 and 210. Once seated, movable compression plate 182 and the plunger are at the threshold pre-load pressure. Further reverse rotation of motor 94 causes the compression pressure within the system to fall below the threshold pre-load pressure, which effectively permits the plunger to displace in a backward manner or direction. As can be seen, when the plunger is experiencing a pressure below the threshold pre-load pressure, and when the movable compression plate 182 is seated, the plunger is immediately movable in a forward or backward direction depending upon the direction of rotation of motor 94. Above the threshold pre-load pressure, plunger movement is stopped and movable compression plate 182 is caused to displace.

Another circumstance may be when the pressure on the plunger exceeds the threshold pre-load pressure, but the product is flowing. In this case, the plunger would not be prevented from moving forward even though the compression plate is unseated from its resting position. Instead, the flow pressure would simply be above the pre-load pressure, wherein the movable compression plate Would be displaced backwards from its resting position, but not far enough to contact the shut-off switch. Forward movement of the drive assembly would still continue to advance the plunger forward to maintain the flow of the product. Indeed, a product may flow above the pre-load pressure or below it, which, in any event, will enable the plunger to continually move forward.

Limit switch 220 may comprise any known switch in the art capable of performing the intended function as described herein. In one exemplary embodiment, limit switch 220 comprises a Motor Actuation Adjustable Pressure Switch (MAAP switch).

Second, again in an above pre-load compression pressure condition where movable compression plate has displaced and is therefore unseated, the pressure exerted by the plunger (or the pressure acting upon the plunger) may suddenly fall below an instant compression pressure occurring within first and second compression springs 174 and 178 at an instant location of movable compression plate 182. An instant compression pressure may be described as follows. As movable compression plate 182 displaces backwards in response to the pressure above the pre-load pressure, first and second compression springs are further compressed. In the embodiment shown herein, with every inch traveled by movable compression plate 182, first and second compression springs 174 and 178 are compressed 50 lbs., according to their spring rating, for a total pressure increase of 100 lbs. within the system (50 lbs. for each spring). Thus, depending upon the instant location of movable compression plate 182, first and second compression springs 174 and 178 will comprise an instant compression pressure or instant magnitude of compression. This instant compression pressure is equivalent to the pressure being exerted by and acting upon the plunger along or about its longitudinal axis, which pressure is also acting upon first and second ball screws 102 and 106 about or along their longitudinal axes. This pressure is essentially transferred from the plunger to ball screws 102 and 106 (or other plunger drive means), to timing belt pulleys 134, to compression plate 182, and eventually to first and second compression springs 174 and 178. As such, if the pressure on the plunger suddenly measures less than the instant compression pressure, the movable compression plate 182 will cease moving backward and will spring forward, under the influence of the springs. This instantaneous forward movement of movable compression plate 182 also will cause the plunger to move forward. Forward movement of movable compression plate 182 will continue until either it contacts stoppers 206 and 210 in its resting position, or until the instant pressure is reached, which instant pressure is above the threshold pre-load compression pressure. As can be seen, once the initial threshold pre-load pressure is overcome, the plunger operates within a pre-determined compression pressure range.

As in the first scenario above, the backward displacement or travel of movable compression plate 182 is limited by the location of limit switch 220 and switch actuator 228. At this location, the system functions as discussed above. The position of limit switch 220 may be adjusted to compensate for the various types and flavors of product loaded into the system.

Limit switch 220 is shown attached to support rod 194-c using switch support 230. Switch actuator 228 is operably coupled to switch support 230. In addition, limit switch is electrically coupled to motor 94 via wires 224, such that when tripped, limit switch 220 shuts off the power to and stops motor 94 from rotating in the forward direction. Of course, to function properly, motor 94 may be reversed even if limit switch, and particularly actuator 228, is engaged. In another aspect, limit switch 220 may be slidably attached to support rod 194-c. In this aspect, limit switch 220 is made adjustable and re-positionable so as to vary the distance movable compression plate 182 must travel to trip the switch and shut-off motor 94. Specifically, limit switch 220 is adjusted by loosening the attachment means, sliding switch support 230 along support rod 194-c in a desired direction and locating limit switch 220 at a desired location, and then re-tightening the attachment means. As limit switch 220 is adjusted, the upper limit of available compression, or the maximum compression pressure, permitted before system shut-off is adjusted. This maximum compression pressure is defined as the shut-off compression pressure and is dictated by the type of product or hard ice cream loaded into the dispenser unit. Indeed, one reason for making limit switch 220 an adjustable switch is due to the different overrun amounts or measurements of ice cream. Different flavors and types of ice cream comprise different overrun measurements. Thus, as it is likely that the hard ice cream dispenser of the present invention will dispense several different types and consistencies of ice cream, each having different overrun measurements, temperatures, viscosities, etc., it is desirable to adjust limit switch 220 accordingly.

The threshold pre-load pressure is also easily varied. This pressure may be varied by varying the amount of initial compression of the springs, or by using different springs or a different number of springs altogether. As such, the threshold pre-load pressure, the type of springs and their spring rates, the number of springs, and other component considerations embodied herein are not to be construed as limiting in any way as their variations will be obvious to one skilled in the art.

Based on the foregoing, the pressure or force exerted by and acting upon the plunger is specifically regulated. The threshold pre-load pressure dictates the capability of the plunger to move in either a forward or backward direction, as well as the pressure at which movable compression plate 182 begins to displace. Indeed, the plunger is only allowed to move if the pressure or force it is exerting, or in other words the pressure or force acting upon it, is at or less than the pre-load pressure. If above this pressure, the plunger is temporarily held stationary, wherein movable compression plate 182 functions to displace, either forward or backward depending upon the instant pressure within the system or until the system power is shut-off. As such, the system comprises an adjustable range of pressures above the threshold pre-load pressure that correspond to an adjustable range within which movable compression plate 182 is allowed to travel. The lower limit of this range is always the threshold pre-load pressure. The upper limit of this range is the pressure within first and second compression springs at the precise location movable compression plate 182 contacts limit switch 220. From this, it can be seen that the magnitude of pressure exerted by the plunger, or in other words the magnitude of pressure acting upon the plunger about its longitudinal axis, affects the ability of the plunger to displace. As such, the system is capable of regulating the pressure exerted by the plunger. In addition, the above-described pressure regulation system allows the hard ice cream dispenser to automatically dispense ice cream as the pre-load pressure can be configured to correspond with the particular type and consistency of ice cream loaded into the dispenser, as well as to start and stop the dispensing unit based on the applied pressures experienced within the system created by the opening and closing of the dispensing nozzle. This concept is discussed in greater detail below.

Pressure regulation system 170 further comprises a compression indicator that functions to indicate to a user the instant or current compression pressure within first and second compression springs 174 and 178 based on the current or instant position of movable compression plate 182. In the embodiment illustrated in FIG. 5, compression indicator consists of a compression scale 232 having a plurality of indicator marks 234 formed thereon. Other compression indicators may be various digital output devices or any other commonly known device or system capable of performing the intended function described herein. As discussed above, it may be desirable to adjust the location of limit switch 220 depending upon the overrun, temperature, viscosity, etc. of a particular ice cream to be inserted into the dispenser. Compression scale 232 functions to identify the most optimal location for limit switch 220. For example, if an ice cream with a relatively high overrun is inserted into the dispenser system, limit switch 220 will be positioned more proximate movable compression plate 182 along support rod 194. At a more proximate position, movable compression plate is only allowed to displace a relatively short distance before triggering limit switch 220 and shutting off forward rotation of motor 94. With a short travel distance, first and second compression springs 174 and 178 are not compressed very far beyond their initial pre-loaded state. Thus, the overall compression pressure within the system is relatively low. On the other hand, if an ice cream with a relatively low overrun is inserted into the dispenser system, limit switch 220 will be positioned further away from movable compression plate 182 at a more distal end of support rod 194. In this more distal position movable compression plate 182 must travel a greater distance before triggering limit switch 220. And, as discussed above, the greater compression plate 182 displaces or travels in a backward direction, the more first and second compression springs 174 and 178 are compressed and the greater the overall compression pressure existing within the system. Achieving different compression pressures within the system is important to accommodate the different types and flavors of products to be dispensed. As such, compression indicator 232 functions to allow the user to identify the correct positioning of limit switch 220 based on the present product.

Referring again to FIGS. 3 and 4, drive assembly 90, pressure regulation system 170, plunger guide system 250, and other various components are supported by back wall 54 of housing 14. Facilitating this support is dorsal wall plate 202. Dorsal wall plate 202 comprises a rigid metal plate that is securely coupled to the back wall 54 of housing 14. Its material composition is such that it is configured to and capable of withstanding the various forces acting therein, thereon, and/or therethrough as induced from drive assembly 90, pressure regulator system 170, as well as various other components. Dorsal wall plate 202 also comprises a size or surface area that substantially covers the surface area of back wall 54 and a thickness suitable for bearing the loads experienced from the attached components and also operation of the hard ice cream dispenser. As such, dorsal wall plate 202 functions as an added support component for back wall 54. Since most of the components of drive assembly 90 are supported either directly or indirectly by back wall 54, this wall must comprise a suitable structural makeup. Dorsal wall plate 202 functions to provide back wall 54 with such a structural makeup. Dorsal wall plate 202 also functions to provide an efficient and simple attachment base for those components necessarily attached thereto. Dorsal wall plate 202 may be attached on the inside or outside surface of back wall 54, but is preferably attached on the outside to counter or oppose the forces acting on back wall 54.

It is noted that in other exemplary embodiments, dorsal wall plate 202 may not be specifically required. Indeed, back wall 54 may comprise a suitable structural makeup so that a separate and independent dorsal wall plate is not required. Specifically, back wall 54 may comprise a rigid material makeup configured to and capable of withstanding the forces applied on and through back wall 54 as induced by the various components attached thereto, and operation of the dispenser.

Figure 2:
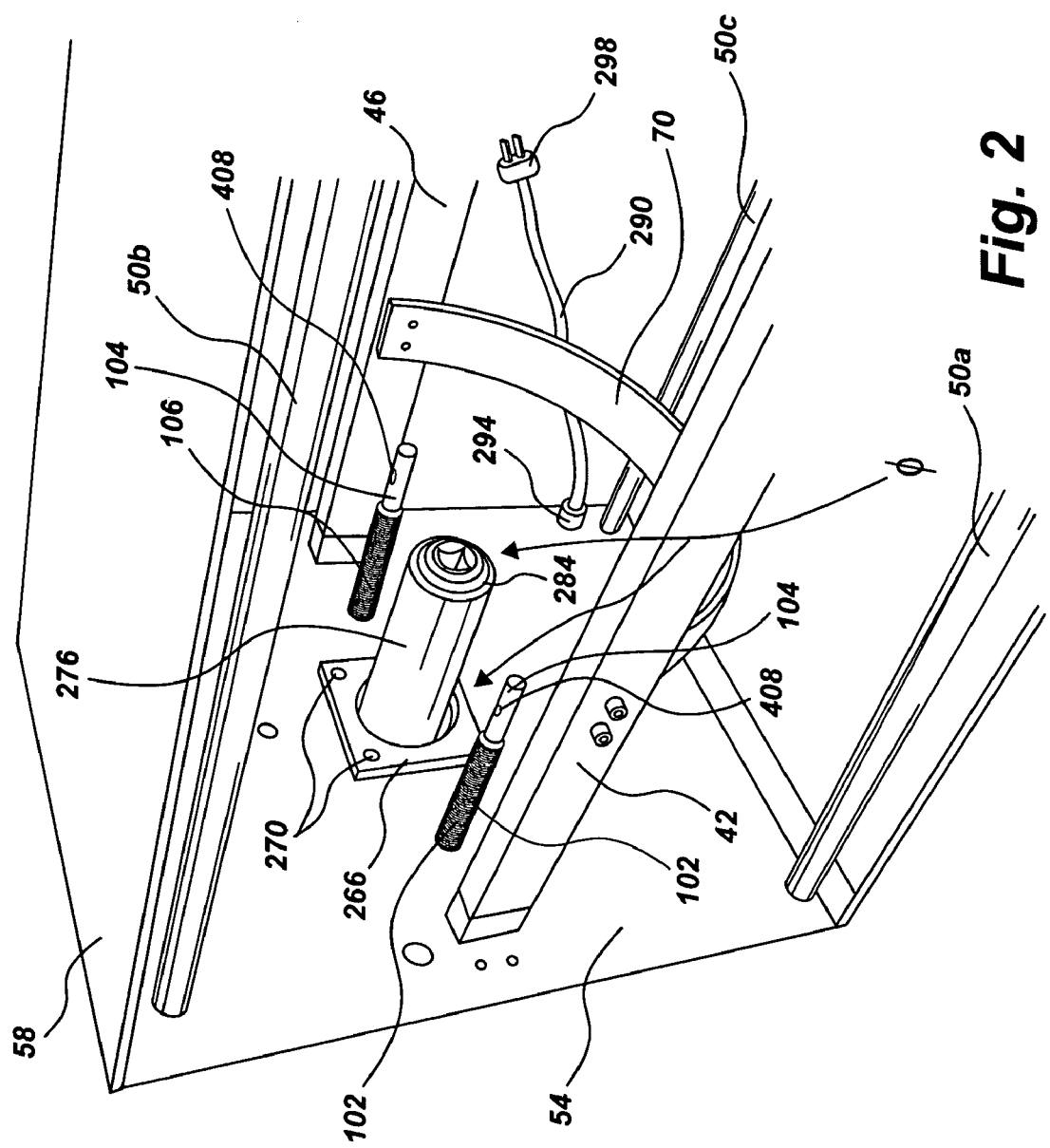
FIG. 2 illustrates a detailed perspective view of the interior of the housing of the hard ice cream dispenser of FIG. 1 and the components contained therein.
Figure 3:
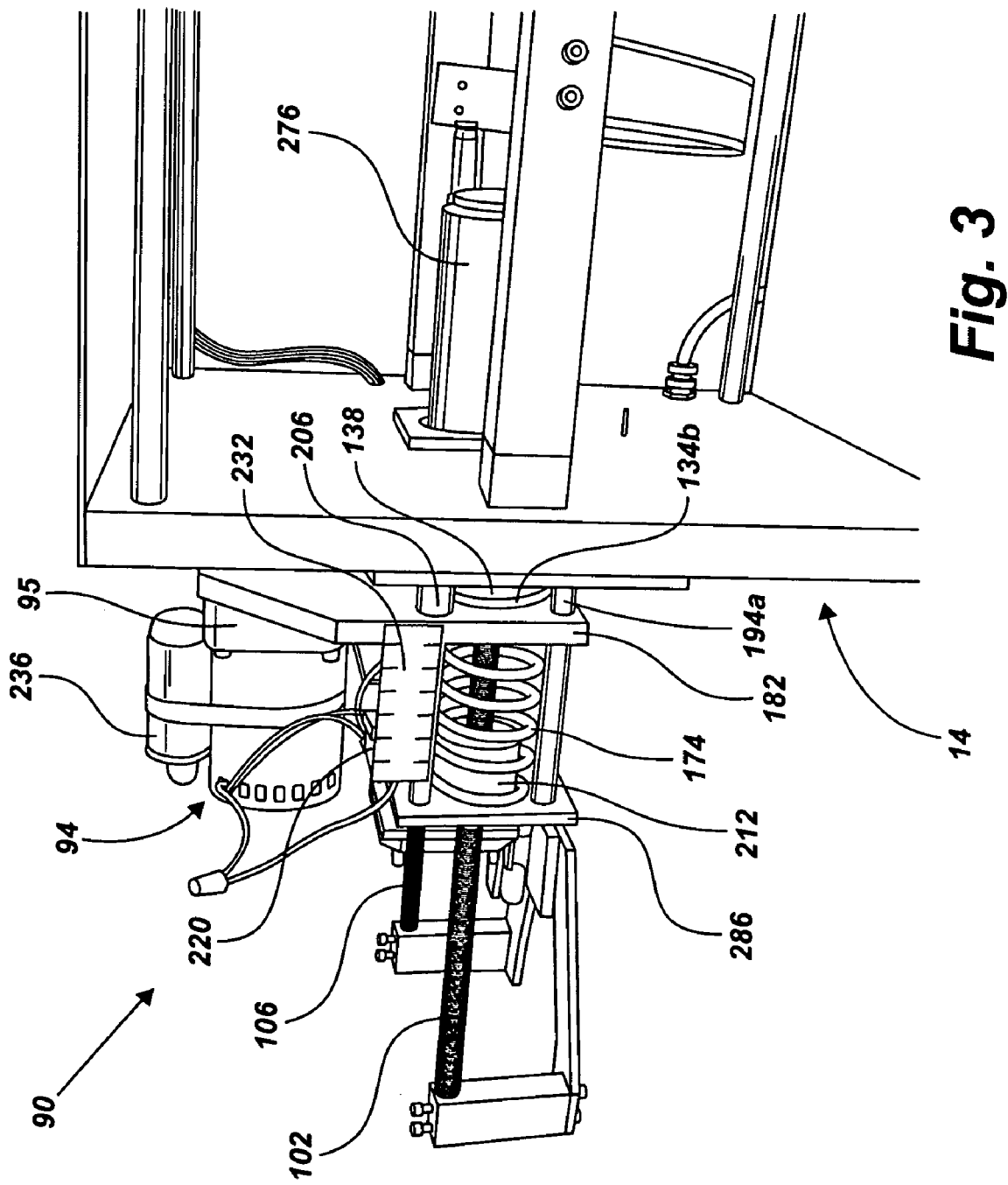
FIG. 3 illustrates a perspective view of the drive assembly used to drive the plunger acting upon and dispensing the ice cream according to one exemplary embodiment of the present invention.

FIG. 2 further illustrates electric cord 290 electrically coupled to housing 14 via cord connect 294 and to motor 94. Plug 298 of cord 290 is designed to fit within a standard electrical outlet configured to provide power to motor 94.

FIGS. 1 and 4 further illustrate hard ice cream dispenser 10 as comprising a contents indicator 310 operably connected to drive assembly 90, wherein contents indicator 310 functions to signal or relay to the user the current amount of product available for dispensing. In the embodiment shown, contents indicator comprises a plurality of gauges 314 in the form of lights that light-up as plunger 330 travels through the ice cream container. As the plunger is displaced forward, trigger plate 122 also displaces forward. As the trigger plate 122 reaches a pre-determined location marking the placement of a switch, the switch is triggered by the trigger plate 122, thus actuating the corresponding gauge. This is repeated consecutively or in succession as the plunger continues to move forward, wherein trigger plate 122 contacts and triggers the various positioned switches, each of which correspond to a different gauge or light located on contents indicator 310. Specifically, each gauge 314 is operably and electrically connected to its own switch (not shown) strategically positioned on switch board 126 via wires 322. Switch board 126 comprises a plurality of switches, each one signaling a different amount of remaining product. As such, gauges 314 are synchronized with the position of plunger 330 along switch board 126.

Trigger plate 122 is shown comprising a length extending between leading and trailing ends. The leading end of trigger plate 122 first contacts a switch. The switch remains triggered and active along the entire length of trigger plate 122 until it comes to the trailing end of trigger plate 122. Once the switch falls off the edge of the trailing end, the switch is deactivated, as is its corresponding gauge. However, at this moment, the leading edge of trigger plate 122 contacts the second switch and activates the next gauge. As such, the distance the switches are placed apart from one another on switch board 126 is approximately equivalent to the length of trigger plate 122.

In one exemplary embodiment, contents indicator 310 may comprise a set of five lights, wherein a first light signals that the bucket is "full," a second light signals that the bucket is "¾ full," a third light signals that the bucket is "½ full," a fourth light signals that the bucket is "¼ full," and a fifth light signals that the bucket is "empty." With the plunger in its fully retracted position, a container of ice cream can be loaded into dispensing system or unit 10. As the plunger is brought into position to start dispensing the ice cream, trigger plate 122 comes in contact with the first switch, thus actuating gauge 314 corresponding to that switch, which gauge signals the container is full. As the plunger continues to move forward and as product is dispensed, trigger plate 122 leaves first switch and contacts the second switch, which may signal that the container is ¾ full. This process continues on as the plunger displaces forward and product is dispensed until the last switch is triggered indicating that the container is empty. Obviously, any number of interim gauges may be used to increase the accuracy and precision of contents indicator 310.

In another exemplary embodiment, contents indicator 310 may comprise a digital readout that is calibrated upon insertion of a new container of ice cream and that continuously signals an exact amount of ice cream remaining within the container. For example, a standard hard ice cream container contains approximately three gallons of hard ice cream, measured in U.S. units. And, since one liquid gallon is equal to 16 liquid cups, this means that the standard bucket comprises approximately 48 cups of hard ice cream. Moreover, a typical or average scoop of ice cream measures approximately ½ of a liquid cup. Therefore, a standard bucket comprises approximately 96 scoops of hard ice cream. Another approximation is that a spherical scoop of ice cream is approximately 2.5 inches in diameter. The volume of a 2.5 inch scoop is 8.18 cubic inches. A container of ice cream is 10 inches tall with a diameter of 9.5 inches, giving a total volume of 708 cubic inches. Thus, one container of ice cream contains approximately 86 scoops. In any event, the contents indicator may continuously count down the number of scoops remaining in a bucket using the relative position of the plunger within the bucket as a reference. Or, the scoop count may be measured by a device that tracks the number of times the scoop is actuated to dispense one scoop of ice cream. There are several possible devices and methods for signaling to a user the current amount of ice cream remaining in the container, each of which cannot be fully described herein. However, one skilled in the art will recognize these, thus they may be considered within the scope of the present invention.

Figure 6:
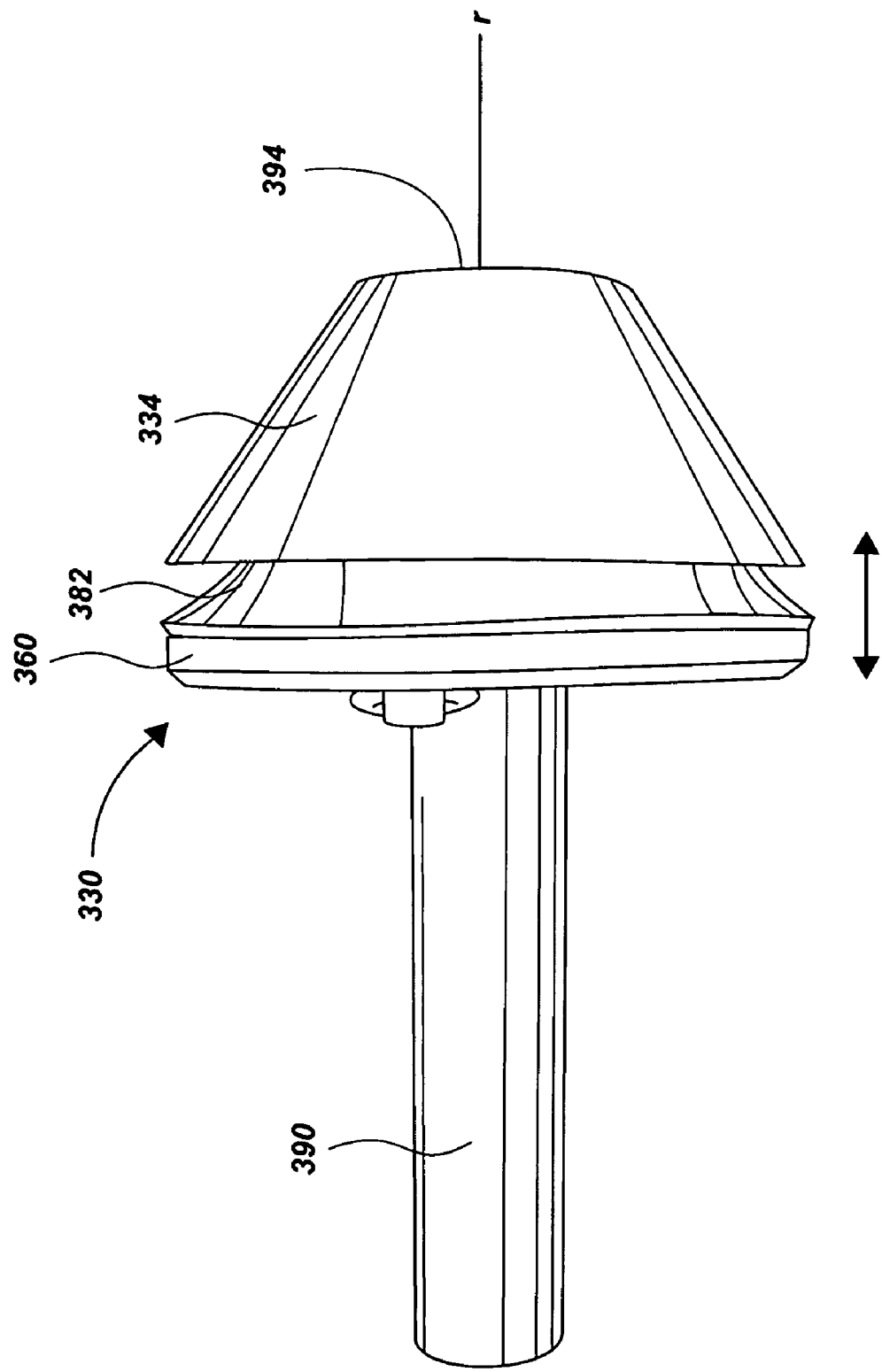
FIG. 6 illustrates a side view of the plunger used to drive the ice cream according to one exemplary embodiment.

Referring now to FIG. 6, illustrated is a side view of one exemplary embodiment of the plunger used to dispense the hard ice cream. As shown, the primary components of plunger 330, which is essentially a conical frustum, include a dynamic lead 334, a base 360, a dynamic seal 382, and a plunger support tube 390. Plunger support tube 390 also comprises a scoop set 394 for receiving the scoop portion of the ice cream scoop discussed below. Scoop set 394 comprises a radius r configured to mate with and complement the radius of the ice cream scoop.

Figure 7:
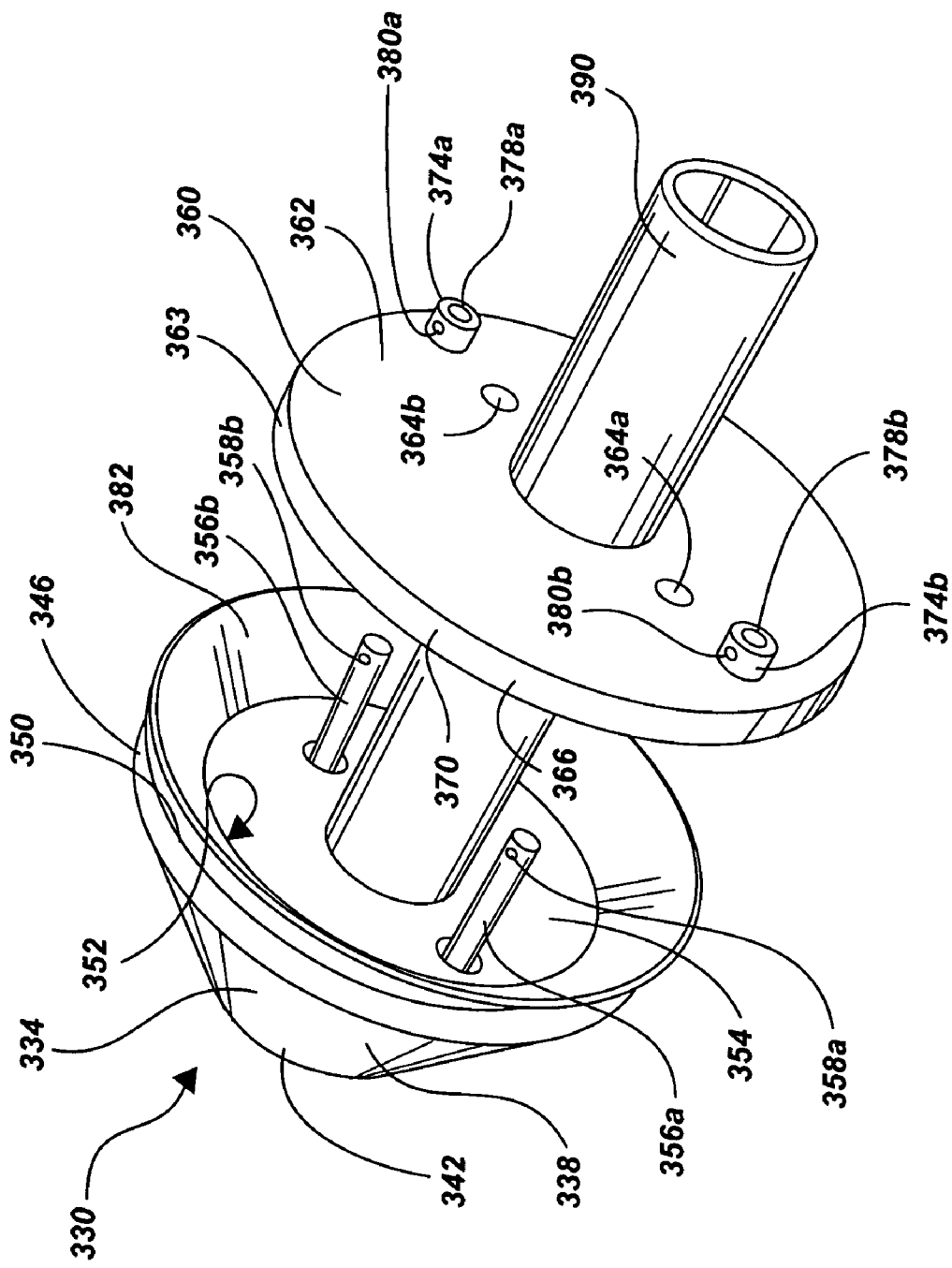
FIG. 7 illustrates an exploded perspective view of the exemplary plunger of FIG. 6.
Figure 8A:
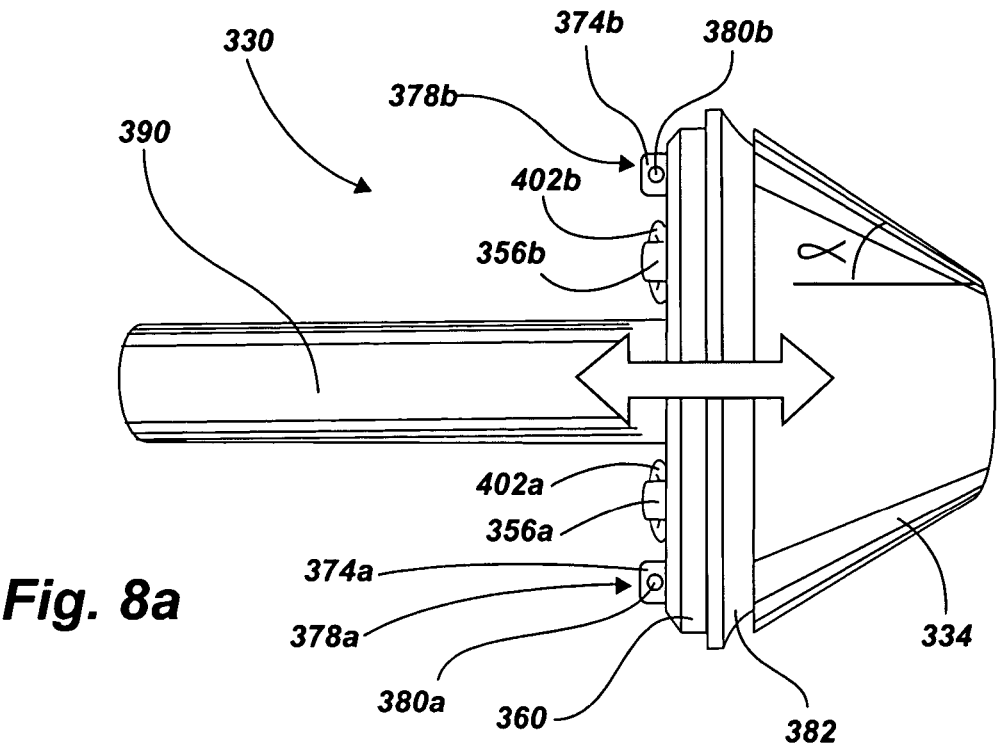
FIG. 8-A illustrates a detailed side view of the exemplary plunger of FIG. 6, and specifically the dynamic seal in its relaxed, non-energized state.
Figure 8B:
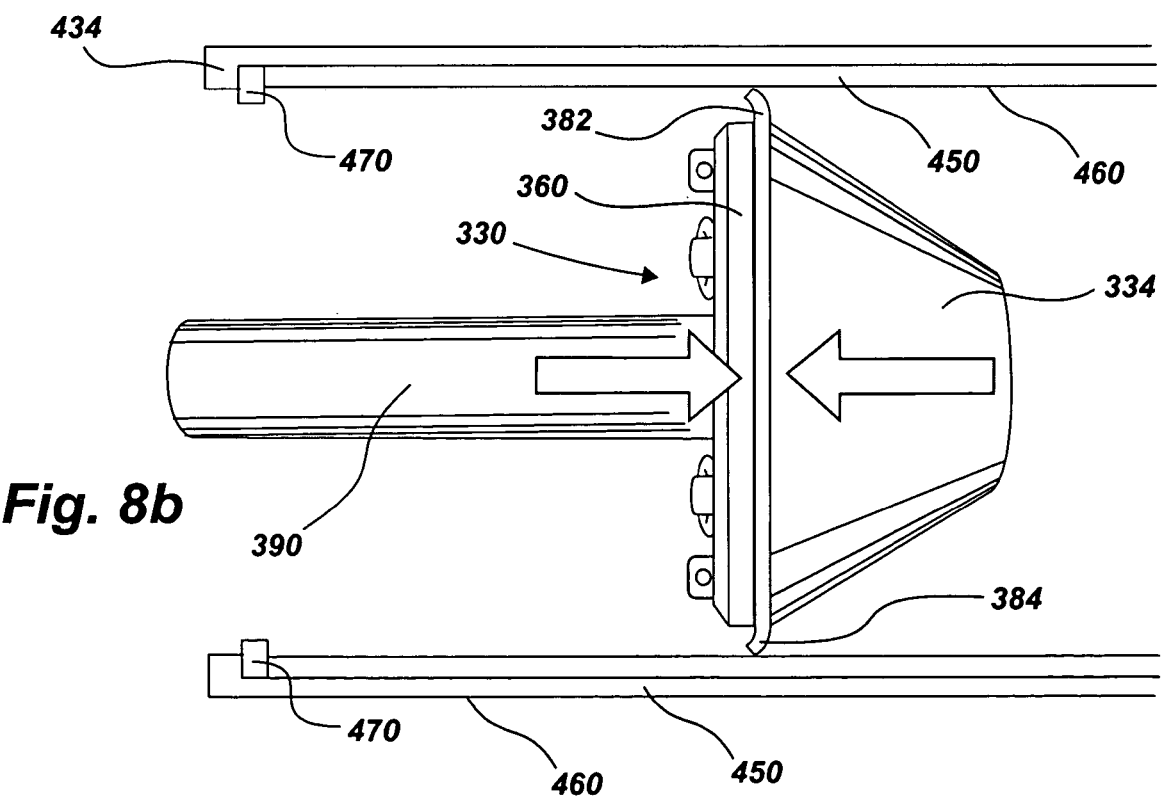

With reference to FIGS. 7, 8-A, and 9-B, plunger 330 is shown in its various stages. Beginning from left to right, dynamic lead 334 comprises a conical shoulder 338 serving as the transition between a nose or nose portion 342 and a rim or rim portion 346. Nose 342 functions as the lead surface for plunger 330 that initially contacts the ice cream. In one aspect, nose 342 comprises a flattened, planar configuration. In another aspect, nose 342 comprises a concave configuration to mate with the scoop when actuated. The diameter of nose 342 may be varied, but typically comprises a diameter measuring less than half of the diameter of rim 346. The diameter of rim 346 is slightly less than the inside diameter of the ice cream container discussed herein.

Plunger 330, and particularly dynamic lead 334, comprises a conical shoulder 338 having a tapered surface configuration that is designed or configured to substantially match and mate with a corresponding or complementary tapered surface within the nozzle component discussed below. In one aspect, dynamic lead 334 may comprise a conical shoulder portion having tapered planar surfaces of equal angle as measured from a longitudinal axis and when viewed from a cross-section dividing the cone longitudinally, thus forming a uniform cone. In another aspect, dynamic lead 334 may comprise a conical shoulder portion having tapered planar surfaces of different angles, thus forming an non-uniform cone. In the embodiments where dynamic lead 334 comprises a non-uniform conical shoulder, these differing tapering planar segments or surfaces preferably transition smoothly into one another.

Dynamic lead 334 also comprises a recessed portion 354 formed within its back 352. Recessed portion 354 is circular in shape and comprises a pre-determined depth. Formed annularly around the perimeter of recess 354 and below rim 346 is a seal seat 350. Seal seat is a groove formed at the junction of the floor of recess 354 and an interior wall extending from rim 346 to recess 354. Seal seat 350 has a groove thickness configured to receive dynamic seal 382 therein.

Dynamic lead 334 also comprises one or more connection pins, shown as connector pins 356-*a* and 356-*b* that are coupled to dynamic lead 334 at a proximate end, and that extend outward a pre-determined distance to a distal end. Connector pins 356 are designed to removably engage base 360 and to slidably couple base 360 to dynamic lead 334. Base 360 has matching apertures 364 formed therein for receiving connector pins 356 therethrough. At the distal end of each of connector pins 356 is a lateral through hole 358 for receiving an attachment pin, thus securing base 360 to dynamic lead 334.

Plunger 330 further comprises a dynamic seal 382. Dynamic seal 382 comprises a stiff, but flexible rubber or other similar material. In the embodiment shown, dynamic seal 382 comprises a cone-shaped rubber seal having a first end configured to seat within seal seat 350 and a second end that extends outward from rim 346 a substantial distance when seal 382 is in a resting state. In one aspect, dynamic seal 382 may be a separate piece that is removably contained within plunger 330. In another aspect, dynamic seal 382 may be integrally formed with dynamic lead 334, a process commonly described as vulcanizing dynamic seal 382 into dynamic lead 334. In any event, dynamic seal 382, and particularly edge 384, functions to contact and seal against the inside wall surface of the container supported in the sleeve as plunger 330 displaces within the container. To assist in the displacement of plunger 330 within the container during the dispensing operation, dynamic seal 382 may be periodically lubricated.

Dynamic seal 382 may comprise varying types and compositions of flexible material with varying ranges of hardness. In one aspect, dynamic seal 382 comprises a rubber material having a hardness ranging between 50 and 70, and preferably 60, durometer. Based on the selected material of dynamic seal 382, and on the configuration in which it is attached or formed to dynamic lead 334, dynamic seal 382 may be made to be stiffer in its flexed or energized state as opposed to its relaxed or static state. This is advantageous because the seal only needs to be stiff while plunger 330 is in contact with the ice cream and when it is performing its dispensing action. In the transitioning pre or post-dispensing positions when plunger 330 is either initially being inserted into the ice cream container and traveling into position or when it is being retracted from the ice cream container, these transitions are made easier by a relaxed and unflexed dynamic seal as the dynamic seal is not in contact (or loose contact) with the walls of the ice cream container or the sleeve in which it is contained.

As indicated above, and as shown in FIGS. 8-A and 8-B, dynamic lead 334 is slidably coupled to base 360. Base 360 comprises a flat bottom portion 362, a rim 363, and a protrusion 366. Rim 370 is approximately the same diameter as rim 346 of dynamic lead 334. Protrusion 366 extends outward from flat bottom portion 362 in a direction towards dynamic lead 334. Protrusion 366 is circular in shape and has a diameter that is approximately the same as an inside diameter of dynamic seal 382, but slightly less. By extending from flat bottom portion 362, protrusion 366 creates a ledge 370 extending around the flat bottom portion 362 a distance below rim 363. Protrusion 366 is configured to seat within recess 354 and dynamic seal 382 contained therein as dynamic lead 334 is slidably forced toward base 360 due to an applied load upon plunger 330. The concept of a plunger having a dynamic lead and a dynamic seal is unique in the art. As plunger 330 displaces to dispense ice cream from the container, plunger 330 will be subject to a substantial load applied initially to its dynamic lead 334 component. Under such a load, dynamic lead 334 is configured to displace toward base 360, which is held stationary via its attachment to the plunger drive means (e.g., first and second ball screws), along connector pins 356. As the compression pressure on plunger 330 increases, dynamic lead 334, having dynamic seal 382 supported therein, mates with base 360. Specifically, protrusion 366 of base 360 contacts seal 382. At the pre-determined compression pressure, protrusion 366 is forced into recess 354 within dynamic lead 334. It is at this pressure that dynamic seal 382 is caused to flex. Further insertion of protrusion 366 into recess 354 causes rim portion 346 of dynamic lead 334 to become proximate rim portion 363 of base 360. These two structures function to force dynamic seal 382 outward so that it is oriented in a substantially perpendicular manner with respect to a longitudinal axis of plunger 330 (see FIG. 8-B). In this perpendicular state, seal 382, and particularly edge 384, is configured to seal against the inside wall 460 of ice cream container 450, as supported within sleeve 434 and the nozzle (not shown), once past rim 470, and to facilitate in the displacement of the ice cream from container 450. It should be noted that dynamic seal 382 only flexes when plunger 330 is driven or displaced in the forward direction and when a suitable, pre-determined compression pressure is applied to plunger 330 in the forward direction. When displaced backwards, such that there is not a sufficient pressure acting upon plunger 330, dynamic lead 334 is not sufficiently mated with base 360 to cause dynamic seal 382 to flex. Also as shown in FIG. 8-B, dynamic seal 382 and edge 384 effectively distorts or bends as it slides along wall 460. This helps to maintain the integrity of the seal when experiencing uneven surface variations. Again, once the compression pressure drops below the pre-determined pressure that causes dynamic seal 382 to flex, edge 384 will retract away from wall 460, thus allowing plunger 330 to be removed from container 450 and sleeve 434 without obstruction.

Based on the foregoing, it can be said that plunger 330 comprises a resting, non-energized state defined when dynamic seal 382 is in a relaxed condition (FIG. 8-A). It can also be said that plunger 330 is an energizing plunger or that it comprises an energized state (FIG. 8-B). These dual states are advantageous for several reasons. First, the primary function of dynamic seal 382 is to seal the container while plunger 330 moves forward against the ice cream to force its movement for dispensing. In its energized state, dynamic seal 382 prevents ice cream from leaking behind the plunger. Once dispensing is complete and the plunger is to be retracted and backed out of the container, its relaxed, non-energized state makes this much more efficient and convenient. In prior related dispensers having only a static seal, retracting the plunger from out of the container is difficult and often causes the seal to engage various components of the dispenser making it difficult to remove the plunger, as well as possibly destroying the ice cream container. This is because the seal has to be the same diameter as the inside wall of the ice cream container in order to properly seal the container during the dispensing process. Therefore, getting the prior related plungers in and out of the ice cream container is difficult.

On the other hand, the present invention plunger 330 solves this problem because dynamic seal 382 is configured to flex from a relaxed position in which its outermost diameter is significantly less than the inside diameter of the ice cream container such that the plunger is easily inserted into and retracted out of the container, to a flexed or energized position, in which its outermost diameter is caused to expand to a diameter suitable for sealing the ice cream container. This is shown in FIG. 8-B. In this energized state, plunger 330 effectively dispenses ice cream while dynamic seal 382, and particularly edge 384, seals against the wall 460 of container 450 as sealed within sleeve 424 to prevent leakage. As can be seen, edge 384 distorts during forward displacement of plunger 330. Once the dispensing process is completed, the plunger's forward movement is stopped. Reversing the plunger or otherwise removing the compression pressure acting upon the plunger subsequently causes dynamic lead 334 to move away from base 360. Dynamic lead 334 is caused to move away from base 360, thus returning plunger 330 to a resting state, partly because of the elastic nature of dynamic seal 382 that effectively functions to bias dynamic lead 334, and partly because of the forces acting on dynamic lead 334 through the contact of seal 382 with the walls of the ice cream container as plunger 330 is caused to retract.

Referring again to FIG. 7, plunger 330 further comprises a plunger support tube 390 in the form of an elongate thin-wall cylinder open at one end. Plunger support tube 390 comprises an inside diameter configured to fit within casing 254 and over a stabilizer core 276 (see FIGS. 1 and 2), thus providing support for plunger 330. Plunger support tube 390 is coupled to dynamic lead 334 at a leading end such that the leading end is flush with nose 342 as shown in FIG. 6. From nose 342, plunger support tube 390 extends through a conduit formed along a longitudinal axis of dynamic lead 334 and through a similar conduit formed within base 360. In this configuration, plunger support tube 390 provides the necessary support to each of the component parts of plunger 330 for operating as intended. In addition, plunger support tube 390 is closed on its front facing end and may comprises a flattened surface designed to be substantially flush with nose 342. Alternatively, plunger support tube 390 may also comprise a concave surface or scoop set 394, in which the radius of the concave end substantially matches the radius of the ice cream scoop attached to the nozzle as described below. Having a concave configuration allows plunger 330 to displace a greater distance within the container without hindering the ice cream scoop and its actuation. FIG. 6 illustrates plunger 330 as having a concave leading end.

With reference to FIGS. 7–8, plunger 330 further comprises means for coupling plunger drive means. In the embodiment shown, plunger drive means comprises first and second ball screws 102 and 106 and means for coupling these comprises screw receivers 374-*a* and 374-*b*, respectively. Screw receivers 374 are securely attached to flat bottom 362 of base 360 and protrude outwardly therefrom. Formed within screw receivers 374 is a recess 378 configured to receive ends 104 and 108 of first and second ball screws 102 and 106 (see FIG. 9), respectively.

Figure 9:
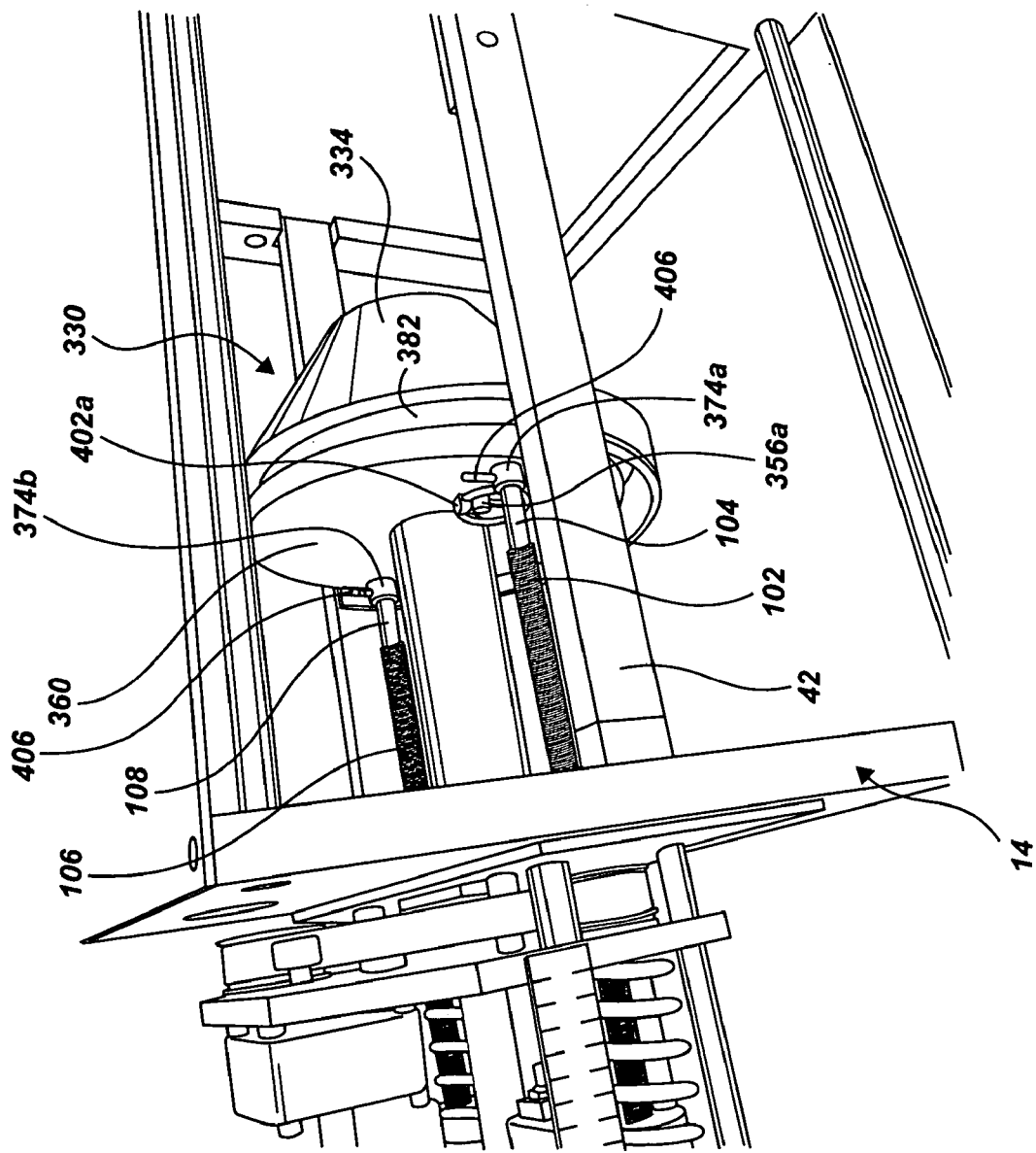
FIG. 9 illustrates a detailed perspective view of the plunger as attached within the housing and to the appropriate plunger drive means of the drive assembly.

FIG. 9 illustrates an elevated side view of plunger 330 in an attached configuration supported within housing 14. Dynamic lead 334 is shown attached to base 360 via connector pins 356-*a* and 356-*b* and attachment pins 402-*a* and 402-*b*, respectively, with dynamic seal 382 positioned therebetween in a relaxed, non-energized state. Plunger support tube 390 is also shown as inserted into casing 354 (not shown) over stabilizer core 376 (also not shown). Moreover, FIG. 9 illustrates how plunger 330 attaches to the plunger drive means, in this case first and second ball screws 102 and 106. Once ends 104 and 108 are seated within recess 378, set pins 406 are inserted through lateral through holes 380-*a* and 380-*b* respectively formed within screw receivers 374-*a* and 374-*b*, which set pins 406 extend through matching lateral through holes 112-*a* and 112-*b* formed within ends 104 and 108 of first and second ball screws 102 and 106, respectively. This configuration securely and removably couples plunger 330 to the plunger drive means, and particularly first and second ball screws 102 and 106 in the embodiment illustrated in the Figures. Therefore, as the plunger drive means is actuated to displace forward or backward, so is plunger 330 attached thereto, as indicated by the arrow.

Figure 10A:
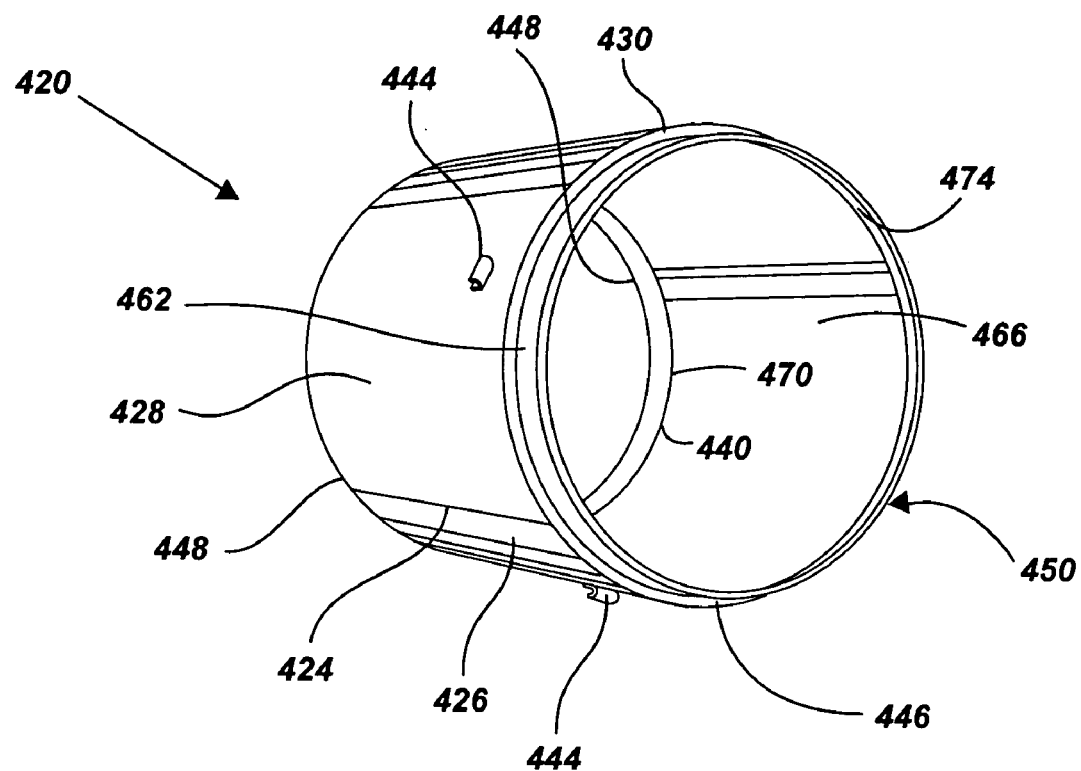
FIG. 10-A illustrates a perspective view of an exemplary container retaining assembly, wherein the ice cream container is supported within a sleeve.
Figure 10B:
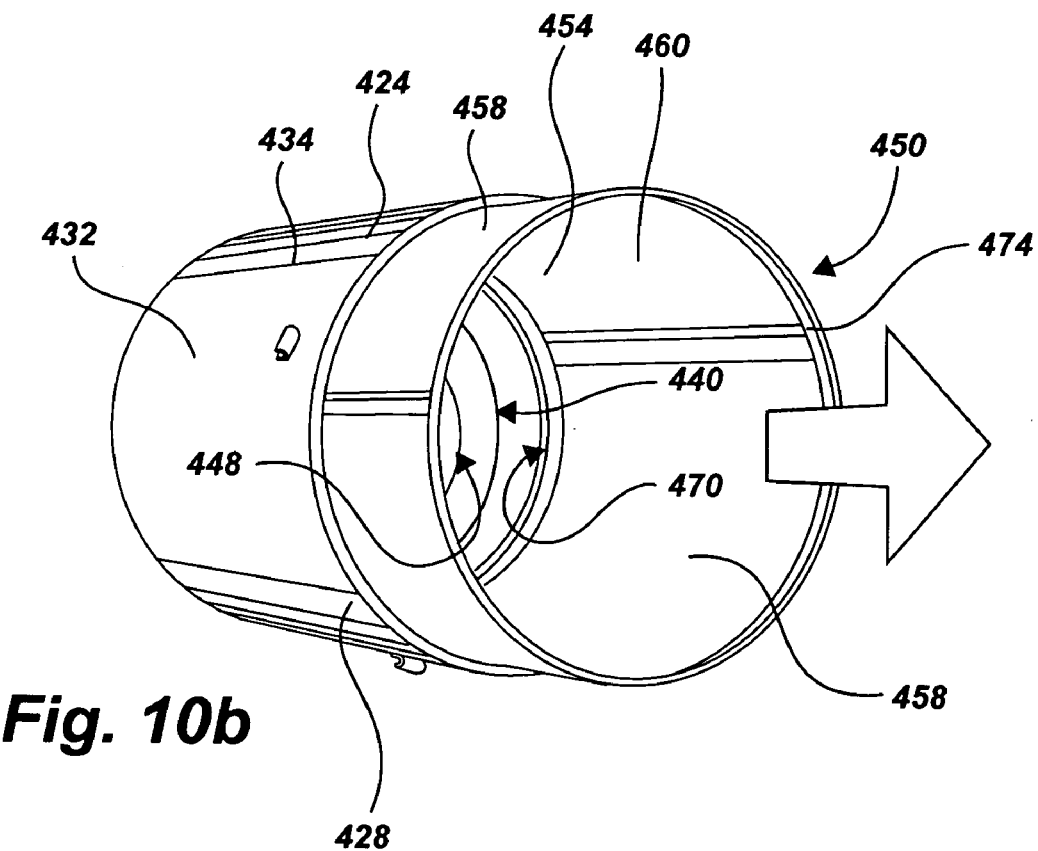
Figure 11A:
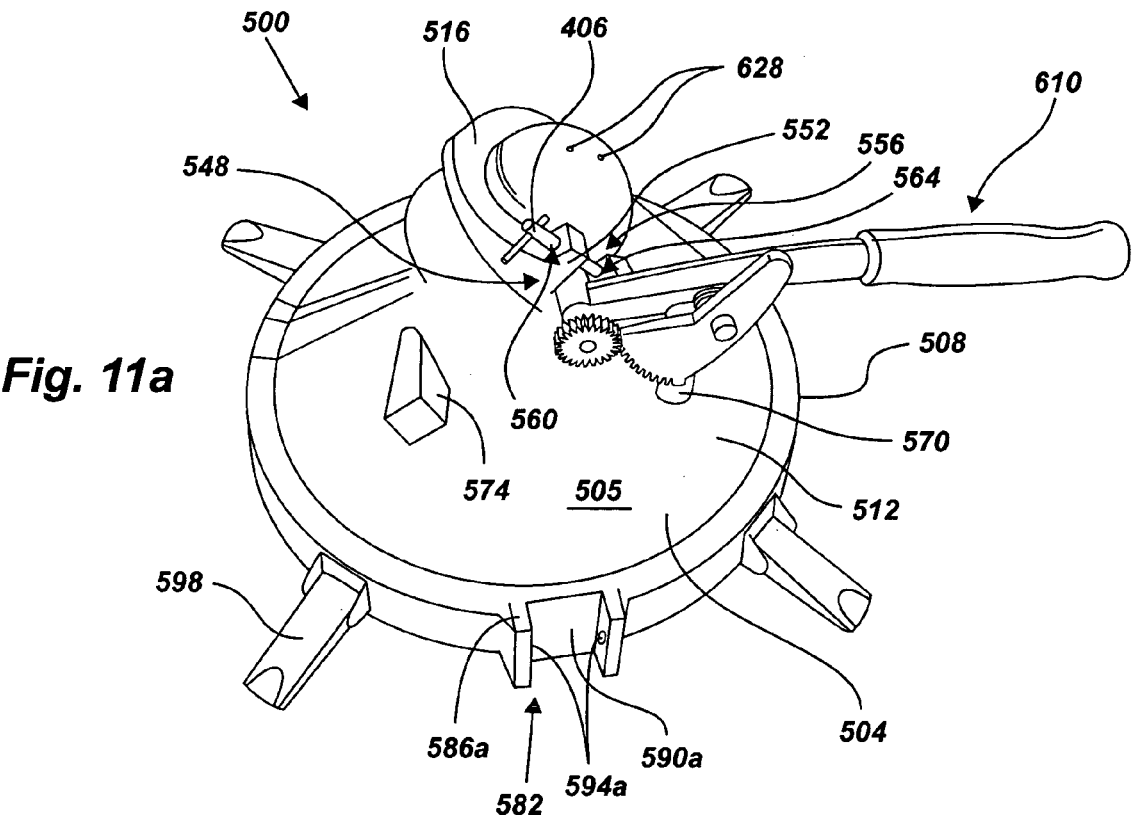
FIG. 11-A illustrates a perspective view of the nozzle component of the hard ice cream dispenser according to one exemplary embodiment of the present invention.
Figure 11B:
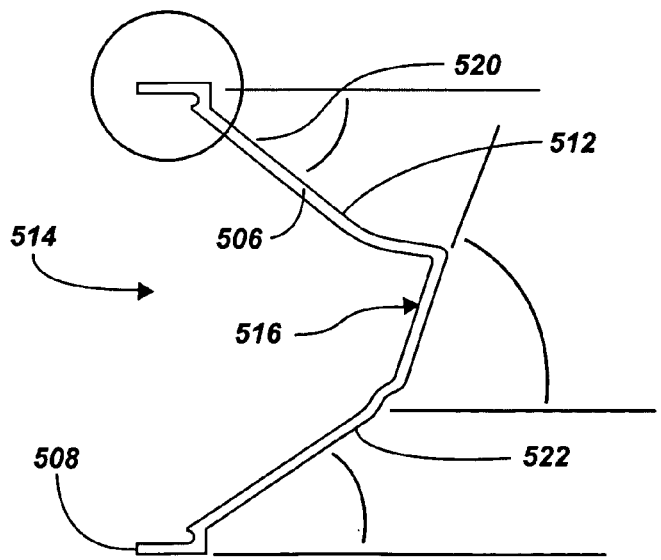
Figure 11D:
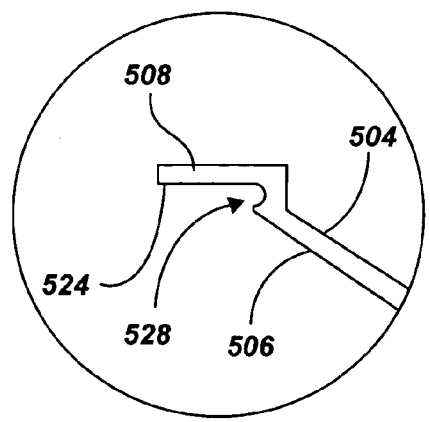
Figure 11C:
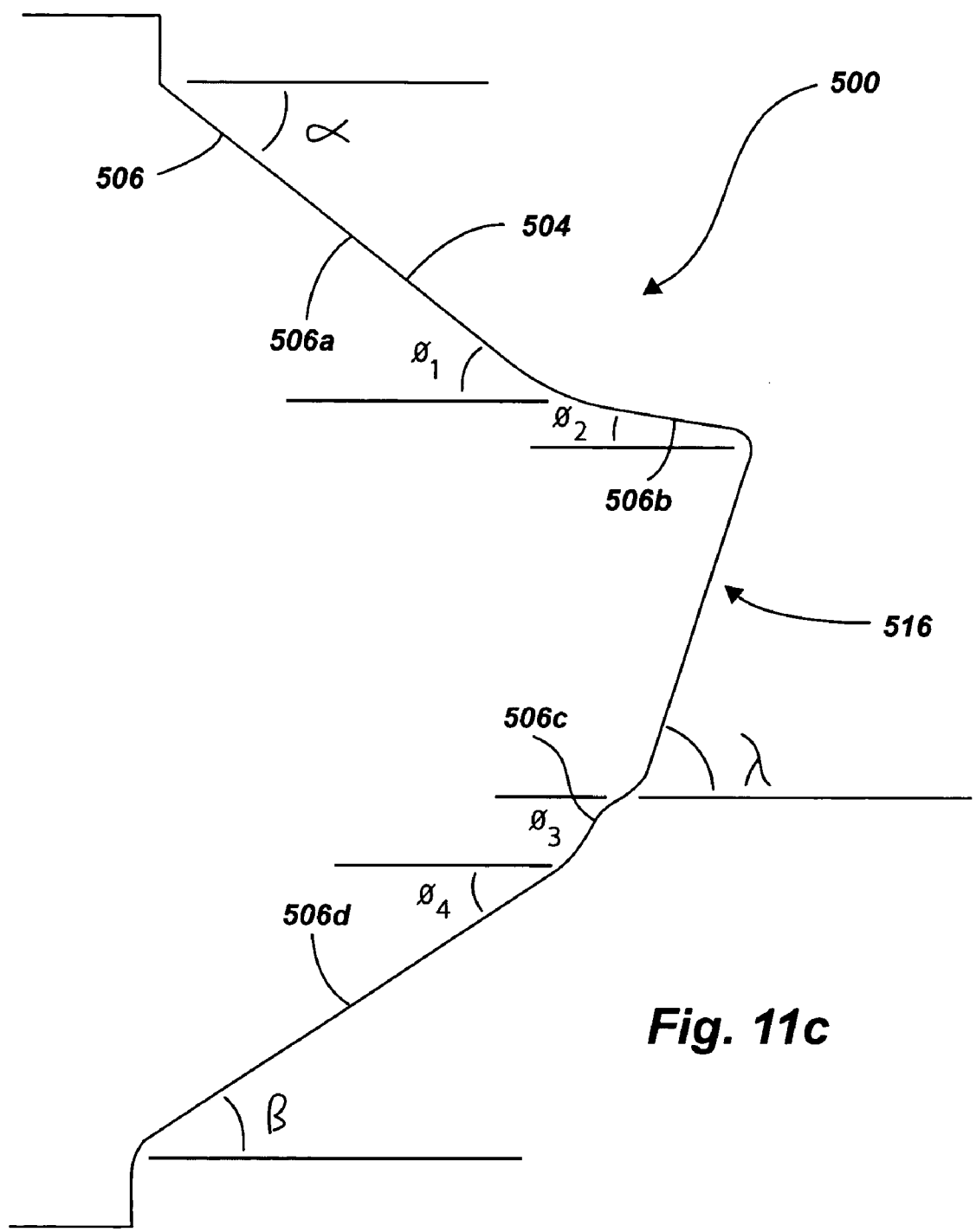

Hard ice cream dispenser 10 further comprises, and FIG. 10-A illustrates, an exploded view of retaining assembly 420 for receiving, securing, and supporting a standard ice cream container filled with ice cream. The two primary components of retaining assembly 420 are sleeve 424 and ice cream container 450. Sleeve 424 comprises a rigid thin-wall cylinder open at both ends. Sleeve 424 comprises a second end portion 428 and second rim 446 for receiving an ice cream container 450 and a first end portion 432 and first rim 448 that functions as the lead end or pressure receiving end first encountered by the plunger just prior to entry into the ice cream container. Sleeve 424 also comprises a wall 426 having an outer surface 434 having a pre-determined diameter, and inner surface 436, also having a pre-determined diameter. The diameter of inner surface 436 is typically approximate, but slightly greater than, the diameter of outer surface 462 of ice cream container 450, which is a standard container, such that ice cream container 450 may be inserted into the sleeve, or rather so the sleeve can be fit over ice cream container 450 with little or no slop. If desired, sleeve 424 may be manufactured to comprise an interference fit with ice cream container 450.

Sleeve 424 functions to provide both lateral and longitudinal support to ice cream container 450. Specifically, during operation of hard ice cream dispenser, the plunger is caused to push against the ice cream. In addition, the seal of the plunger is designed to seal the plunger against wall 460, and particularly the inner surface 466, of ice cream container 450. Without sleeve 424, wall 460 of ice cream container 450 would buckle, rip, or otherwise malfunction under the significant forces applied to the container. As such, sleeve 424 is provided to give additional support to the ice cream container inserted therein. Since sleeve 424 is rigid and capable of withstanding the lateral, longitudinal, and other forces applied to it, and since the fit between ice cream container 450 and sleeve 424 is a close fit (e.g., one with little tolerance between the two adjacent wall structures), the forces applied directly to ice cream container 450 are transferred and borne by sleeve 424 instead of ice cream container 450.

Sleeve 426 also functions as an insulator that helps to protect the ice cream from temperature differentials. In a freezer there is product temperature and ambient temperature. Product temperature is the controlling temperature and the one that is of the most concern. Sleeve 426 helps to regulate the product temperature of the ice cream and to control temperature differentials that often result from frequent opening and closing of the freezer, power shortages, etc.

As can be seen from FIG. 10, ice cream container 450 comprises an upper end portion 454 and an upper rim 470 that are inserted into and seated within sleeve 424, and a lower end portion 458 and a lower rim 474 that are without sleeve 424, or in other words, that extend a pre-determined distance above second rim 446 of sleeve 424. Stated differently, sleeve 424 comprises an overall height that is less than the overall height of ice cream container 450, thus allowing lower end portion 458 and lower rim 474 of container 450 to protrude or extend out from second end portion 428 and second rim 446 of sleeve 424 a given, pre-determined distance. The differential in height between sleeve 424 and ice cream container 450 is so that lower end portion 458, and particularly lower rim 474, of ice cream container 450 may engage and be supported within the nozzle portion of the dispensing unit. This concept is discussed more fully below.

From this it can be seen that ice cream container 450 is inserted and supported within sleeve 424 in an inverted or backwards manner or orientation (hereinafter the backwards placement of ice cream container 450 is referred to as "inverted"). Ice cream container 450 is preferably inserted within sleeve 424 in an inverted manner due to the structural characteristics of ice cream container 450. It has been discovered that inverting the ice cream container within the sleeve greatly facilitates displacement of the ice cream within and out of its container. Specifically, an ice cream container is constructed so that its bottom portion is formed together with its side wall and crimped together using a metal rim, hence lower rim 470. When the bottom portion is removed, the strength of rim 470 is dramatically reduced as there is no longer material being supported therein. As such, the structural integrity of the ice cream container is weakened, and any attempts to advance a plunger therethrough, wherein the plunger has sealing characteristics, functions to crumple the wall of the container. Therefore, inverting the container allows the much stronger upper rim portion to be seated within the sleeve on its pressure side, or rather, on the side initially receiving the plunger. In this orientation, the plunger may advance through the container, and seal against its wall, without damaging the container.

Alternatively, sleeve 424 may comprise a two-piece design whose overall height is greater than the overall height of the ice cream container. In this embodiment, the sleeve may be configured to provide two-way longitudinal support to the ice cream container, wherein the two sleeve components are removably coupled together once the ice cream container is inserted into one or the other. Stated differently, rather than having the nozzle support the lower rim of the ice cream container, the sleeve may be configured to provide this support. In this embodiment, the nozzle would not comprise a channel configuration for receiving the lower rim of the ice cream container, but would simply attach to sleeve 424 to perform its dispensing functions as normal.

Formed on the inner wall 436 within the first end portion 432 of sleeve 424 is a container support, shown in the form of a stopper or lip 440. Lip 440 is substantially perpendicular to wall 426 and may comprise a flat, planar configuration, a concave configuration, a formed groove configuration, or any other suitable structure capable of receiving or engaging upper rim 470 and supporting container 450 in a longitudinal manner, or rather to prohibit its movement in a longitudinal direction within sleeve 424. As such, lip 440 is configured to receive and engage upper rim portion 470 of ice cream container 450 and to support container 450 therein once inserted into sleeve 424, thus functioning to keep ice cream container 450 from sliding all the way through sleeve 424. Lip 440 is shown extending annularly around inner wall 436. Alternatively, inner wall 436, and particularly the container support, may comprise a series of nubs or protrusions extending therefrom and positioned about a common plane circumference that are also capable of receiving and supporting rim portion 474 of ice cream container 450. The function of the container support is to prohibit the slipping of ice cream container 450 within and about sleeve 424. Moreover, when coupled with the structure of the nozzle that receives and secures upper rim 470, ice cream container is secured from moving in any direction, as will be explained more fully below. In the embodiment shown, lip 440 protrudes a pre-determined distance from wall 426, which distance protrudes such that it is flush with lower rim 474 of ice cream container 450. From its outermost point, lip 440 may transition into wall 426, such that the portion of wall 426 below lip 440 would comprises a greater wall thickness than the portion of wall 426 above lip 440, although this is not necessary. Lip 440 may comprise a thin ridge or ledge that simply protrudes from a wall of uniform cross-section or diameter. Moreover, lip 440 is positioned a pre-determined distance up from first rim 448 so that as the plunger enters the sleeve and subsequently the ice cream container, its dynamic seal is able to be contained within sleeve 424 a sufficient distance to seal against wall 426 of sleeve 424 to prevent ice cream from leaking out as the plunger contacts the ice cream. As the plunger progresses forward and ice cream is dispensed, the dynamic seal will eventually enter and seal against the ice cream container itself.

Of course, the size and positioning of lip 440 may vary as needed. In addition, the size of sleeve 424 may vary as needed, depending upon the shape and configuration of the ice cream container to be loaded into the dispensing unit. Variants in sleeve size and container supports will be obvious to one skilled in the art.

Coupled to outer surface 434 of wall 426 are a plurality of latch receivers 444. Latch receivers 444 are designed and configured to receive a corresponding latch member (see FIG. 11-A) coupled to the nozzle component for securely and removably coupling retaining assembly 420 to the nozzle.

Referring now to FIGS. 11-A and 11-B, hard ice cream dispenser 10 further comprises a nozzle 500 that functions to removably couple to the sleeve/ice cream retaining assembly described above, as well as to facilitate the dispensing of a scoop of ice cream from the ice cream container into a suitable receptacle, ice cream cone, etc. In the embodiment shown, nozzle 500 comprises a substantially conical shaped body 504 having an wall with an inner surface 506, and outer surface 505. Nozzle 500 also comprises an inlet 514 configured to receive ice cream therein from an ice cream container, and an opening or spout 516 configured to interact with the ice cream scoop for the dispensing of the ice cream into the scoop. Spout 516 is configured with a pre-determined size and shape to control the volume and cross-sectional size of the dispensed ice cream.

Transitioning from body 504 is collar 508, which is a substantially cylindrical structure annularly surrounding the widest diameter portion of body 504. Collar 508 comprises a structural configuration designed to receive the open end and lower rim portion of an ice cream container therein upon attachment of nozzle 500 to the sleeve as described above (see FIG. 10). In addition, collar 508 is designed to abut the second rim portion of the sleeve when attached. The inside diameter of collar 508 is approximately the same size as the inside diameter of the sleeve and just slightly larger than the outside diameter of the ice cream container so the ice cream container may fit snugly within collar 508 upon attaching nozzle 500 to the sleeve.

FIG. 11-B illustrates a cross-sectional side view of nozzle 500 as illustrated in FIG. 11-A. As shown, nozzle 500, and particularly body 504, comprises upper and lower tapered segments 520 and 522, respectively, which tapered segments are shown oriented on angles $\alpha$ and $\beta$. Angles $\alpha$ and $\beta$ represent the respective angles of the upper and lower tapered segments of body 504, measured from a plane parallel to a longitudinal axis of nozzle 500. Upper and lower tapered segments 520 and 522 may comprise similar angles $\alpha$ and $\beta$ such that body 504 is uniform, or rather so that it comprises a symmetrical cone configuration along its longitudinal axis. In this configuration, spout 516 is typically oriented substantially about the longitudinal axis and has an angle $\lambda$, also measured from a plane parallel to the longitudinal axis.

Alternatively, upper and lower tapered segments 520 and 522 may be formed and oriented at different angles with respect to a longitudinal axis, such that upper tapered segment 520 comprises an angle $\alpha$ that is different than lower tapered segment 522 comprising an angle $\beta$. In this embodiment, upper tapered segment 520 comprises an inside surface 506 that is oriented on a different angle than inside surface 506 of lower tapered segment 522. In this embodiment, upper and lower tapered segments 520 and 522 are configured to transition into one another such that body 504 still comprises a substantially conical shape. In addition, upper and lower tapered segments 520 and 522 must still transition into collar 508 so that nozzle 500 may still removably couple the ice cream retaining assembly.

In one aspect, upper tapered segment 520 is oriented at an angle $\alpha$ measuring within the range of 0° and 60°. Likewise, lower tapered segment is oriented at an angle $\beta$ measuring within the range of 0° and 60°. Spout 516, integrally formed with upper and lower segments 520 and 522 is oriented at an angle $\lambda$ measuring within the range of 0° and 90°.

FIG. 11-C illustrates a cross-section of another exemplary embodiment of nozzle 500 comprising a non-uniform inside surface configuration, wherein varying integrally formed surface areas 506 are oriented at different angles $\theta$ on the inside surface of body 504 and/or the inside surface of spout 516, as measured from one or more planes parallel to a longitudinal axis of nozzle 500. The function of these differing surface areas is to control the flow of ice cream within the nozzle, and to facilitate the flow of the ice cream into the ice cream scoop through spout 516. Stated differently, the function of these differing surface areas is to facilitate and make possible a pre-determined flow pattern within or through nozzle 500, which flow pattern is dictated by the orientation and positioning and size of these varying surfaces. As shown, body 504 comprises an inside surface 506 having multiple surface areas oriented at different angles. Specifically nozzle 500 comprises an inside surface 506-$a$ oriented on angle $\theta_1$ that is integrally formed with and transitions into inside surface 506-$b$ oriented on an angle $\theta_2$. Inside surface 506-$b$ is integrally formed with and transitions into inside surface 518 of spout 516 having an angle $\lambda$. Also integrally formed with and transitioning into inside surface 518 of spout 516 is inside surface area 506-$c$ oriented on an angle $\theta_3$. Finally, inside surface area 506-$c$ is integrally formed with and transitions into inside surface area 506-$d$ oriented on an angle $\theta_4$.

FIG. 11-C illustrates one exemplary embodiment and inside surface configuration, wherein $\theta_1$ and $\theta_4$ of inside surfaces 506-$a$ and 506-$d$, respectively, are substantially the same angle. However, inside surface 506-$b$ comprises an angle $\theta_2$ that is substantially less than that of angle $\theta_1$ of inside surface 506-$a$, such that inside surface 506-$b$ comprises a relatively flat surface segment. On the other hand, opposite inside surface area 506-$b$ is inside surface area 506-$c$ oriented on an angle $\theta_3$ that is relatively steep as compared to angle $\theta_2$, thus causing inside surface area 506-$c$ to form a wall within nozzle 500. During operation of the hard ice cream dispenser, inside surface 506-$b$, with its relatively small angle of orientation, facilitates smooth flow of the ice cream into and out of spout 516. On the other hand, inside surface 506-$c$, with its relatively large or steep angle of orientation, functions to hinder the flow of the hard ice cream into and out of spout 516. As such, the flow of ice cream is increased near the top of nozzle 500, thus facilitating flow into the ice cream scoop. Moreover, with an attached ice cream scoop in an actuated position, wherein the scoop enters the nozzle, the slowed flow along the bottom helps to keep the ice cream from flowing out of the spout. For example, with the scoop in the half-actuated position, the steep lower segment, and the edge of the scoop along the upper segment, prevents flow. Moreover, the pressure regulator system is preferably adjusted so that the motor does not start when the scoop is being actuated.

Nozzle 500 may comprise any number of different surface areas making up its inside surface. Those illustrated in FIG. 11-C are not meant to be limiting in any way. In addition, these surface areas may comprise any type of configuration and may comprise any angle $\theta$ ranging between 0° and 90°. Moreover, it should be noted that since nozzle 500 is substantially conical in shape, the surface areas may or may not be planar. Indeed, they each will typically comprise a tapering configuration with varying radius' of curvature. However, they may be planar. In order to achieve or obtain these different surface areas, the wall thickness of nozzle 500 will most likely be non-uniform and comprise varying thicknesses, especially if a uniform outer surface area 505 is to be maintained.

FIG. 11-D illustrates a detailed cross-section view of collar 508 as identified in FIG. 11-B. As shown, collar 508 comprises an inside surface 524, wherein a portion of this inside surface functions as one wall of channel 528. The other wall of channel 528 is comprised of an extension of inside surface 506 of body 504. Stated another way, channel 528 is positioned within nozzle 500 at the intersection of collar 508 and the tapered body 504 such that collar 508 ends in a channel. Channel 528 is formed within collar 508 such that it extends in an annular manner around the inside of collar 508 and is configured to receive the lower rim of the ice cream container as contained in the sleeve. As such, channel 528 comprises a channel width that is slightly greater than the thickness of the lower rim of the ice cream container. In addition, collar 508 comprises a depth sufficient to receive the lower portion of the ice cream container extending from the lower rim of the sleeve, such that when nozzle 500 is coupled to the ice cream retaining assembly (including the sleeve), the lower rim of the ice cream container is properly contained within collar 508, wherein the outer most edge of collar 508 abuts or is at least adjacent the second rim of the sleeve. This effectively causes at least a portion of the tapered section to insert into the lower interior portion of the ice cream container. This is shown in greater detail in FIGS. 12-A and 12-B.

Referring again to FIG. 11-A, nozzle 500 further comprises a scoop support 548 for receiving and removably coupling an ice cream scoop. In one exemplary embodiment, scoop support 548 comprises a u-shaped support 552 integrally formed with a rim portion of spout 516. Scoop support 548 may also be formed on nozzle 500 near or adjacent spout 516. In any event, scoop support 548 is designed and configured to support an ice cream scoop therein, thus allowing the ice cream scoop to interact with spout 516 to dispense a scoop of ice cream. In the embodiment shown, u-shaped support 552 effectively creates a channel 556 configured to receive a portion of the ice cream scoop therein. U-shaped support 552 functions to support the scoop as coupled to nozzle 500 and about spout 516, as well as to facilitate the operation or actuation of the ice cream scoop with respect to spout 516, as will be described in greater detail below. Formed within the two protruding members of u-shaped support are apertures 560 and 564, which function to receive a set pin therein for retaining the rod portion (see rod 620 in FIG. 15) of the ice cream scoop seated within channel 556.

Formed within an inside surface 518 of spout 516 is a pivot mount 566. Pivot mount 566 is configured to receive a corresponding pivot pin (see pivot pin 624 in FIG. 15) formed on the ice cream scoop. To attach the ice cream scoop to nozzle 500, the pivot pin is inserted into the pivot mount 566 and the axle of the ice cream scoop is inserted into channel 556, which is secured by a set pin. Once the pivot pin is inserted into pivot mount 566 and the axle secured within channel 556, the ice cream scoop is allowed to rotate, which rotation effectively rotates the attached scoop within spout 516.

Supporting the attached ice cream scoop in a resting position is rest 570. Rest 570 protrudes from outer surface 512 of body 504 a pre-determined distance and is positioned on outer surface 512 such that it contacts the shaft of the ice cream scoop. Rest 570 supports the ice cream scoop in a substantially vertical orientation. Also extending from outer surface 512 of body 504 is cam stop 574. Cam stop 574 comprises a contact surface 576 configured to receive a cam actuator on the ice cream scoop. Cam stop 574 provides the necessary countering force to activate the cam on the ice cream scoop upon forced upward rotation of the ice cream scoop. The relationship of each of these components of nozzle 500 with the ice cream scoop will be discussed in greater detail below.

Nozzle 500 further comprises coupling means 582 configured to couple nozzle 500 (and the attached ice cream retaining assembly) to one or more components of the ice cream dispenser housing (not shown). In one exemplary embodiment, nozzle 500 comprises two opposing coupling means 582-a and 582-b, each comprising side supports 586-a and 586-b, respectively. Side supports 586-a and 586-b form opposing channels 590-a and 590-b, respectively, that are each configured to receive opposing retaining rails of the dispenser housing. Upon sliding channels 590-a and 590-b over the retaining rails, apertures 594-a and 594-b align with corresponding apertures in the retaining rail, wherein a set pin may be inserted to secure the nozzle and the attached ice cream retaining assembly to the housing.

Figure 14:
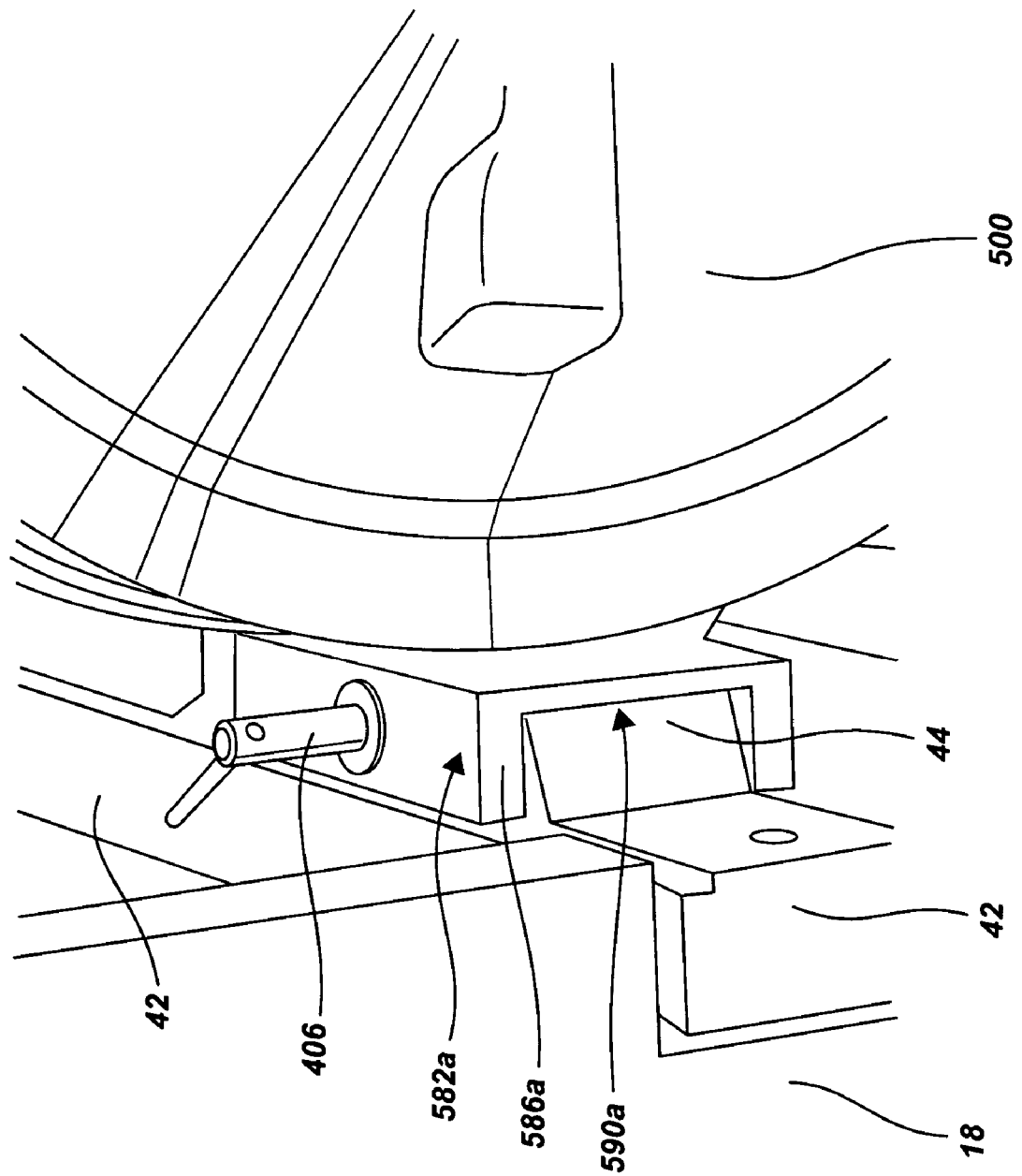
FIG. 14 illustrates a detailed perspective view of the attachment configuration used to attach and secure the nozzle to the housing of the hard ice cream dispenser.

The attachment of nozzle 500 to the housing is shown and described in greater detail in FIG. 14.

Nozzle 500 further comprises attachment assembly, shown as latch mechanisms 598, for removably coupling or securing nozzle 500 to the ice cream retaining assembly (the sleeve and ice cream container supported therein). Nozzle 500 comprises four latch mechanisms 598 evenly spaced or positioned about collar 508 and securely coupled to collar 508. Latch mechanisms 598 removably couple the ice cream retaining assembly to nozzle 500 via the corresponding latch receivers located on the sleeve. Of course, other types of attachment assemblies may be used, as will be recognized by one skilled in the art. As such, those specifically shown and discussed herein are not meant to be limiting in any way.

Figure 12A:
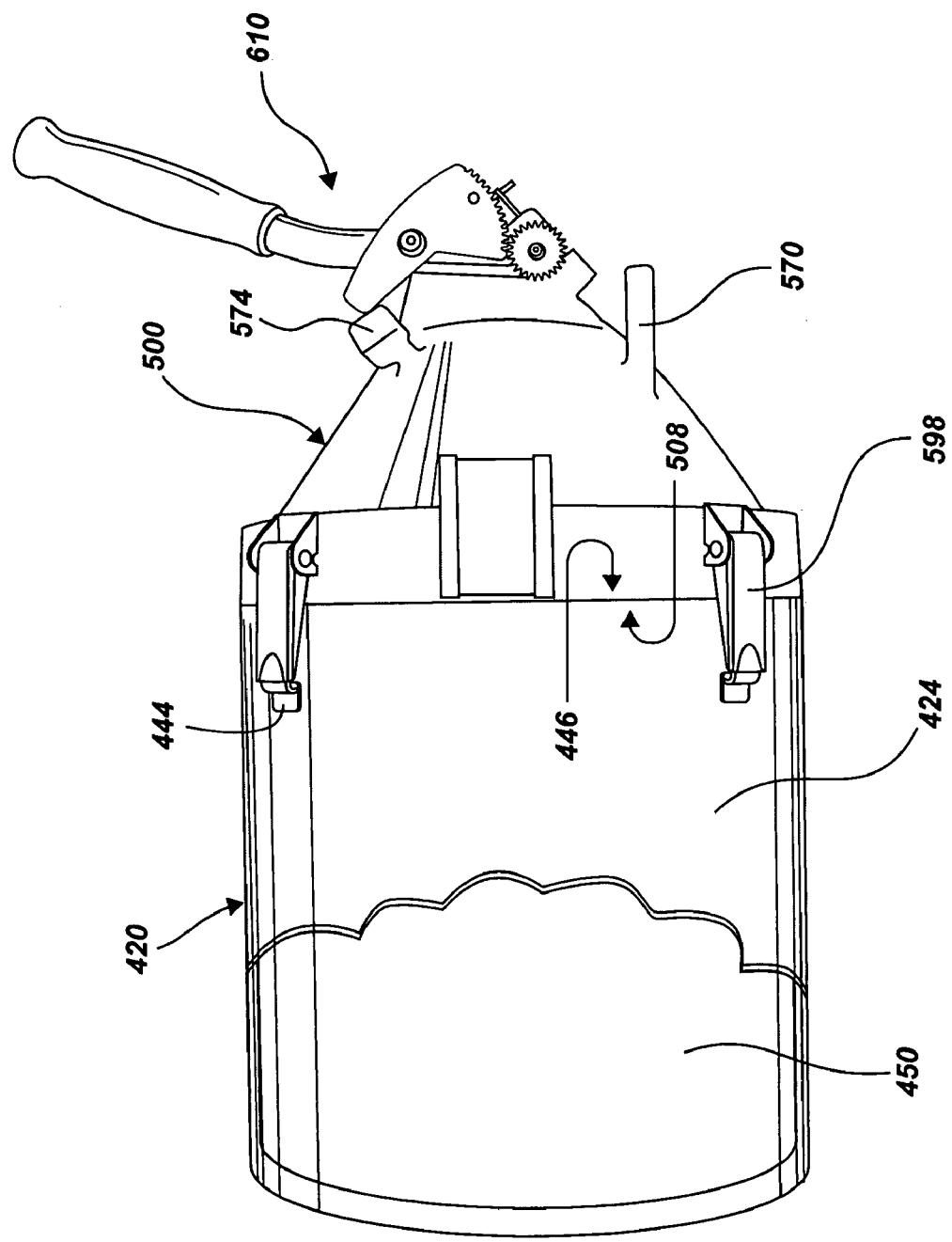
FIG. 12-A illustrates a side view of an exemplary nozzle as attached to an exemplary ice cream container retaining assembly (i.e., the sleeve and the ice cream container) coupled together in a mating relationship and as containing and supporting an ice cream container therein, as well as an ice cream scoop attached to the nozzle according to one exemplary embodiment.
Figure 12B:
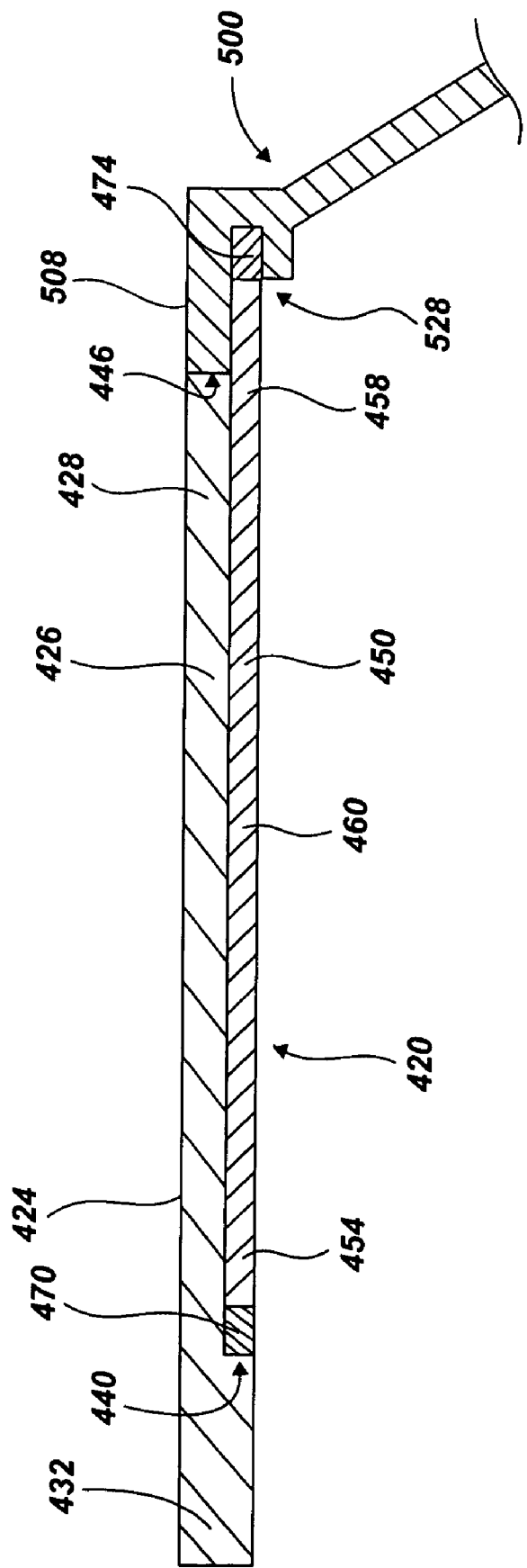

FIG. 12-A illustrates a perspective view of the ice cream retaining assembly 420, consisting of sleeve 424 and ice cream container 450, coupled to nozzle 500. As can be seen, nozzle 500 securely couples to sleeve 424 via latch mechanisms 598 that latch and secure to latch receivers 444 positioned on and secured to sleeve 424. Second rim portion 446 of sleeve 424 abuts or is juxtaposed to collar 508 of nozzle 500 allowing the lower end of the ice cream container to be inserted within the collar 508 of nozzle 500. FIG. 12-A further illustrates ice cream scoop 610 as coupled to nozzle 500, secured in place by set pin 406, and resting upon rest 570.

FIG. 12-B illustrates a cut-away cross-section showing ice cream container 450 as contained and supported within sleeve 424 and nozzle 500, as well as nozzle 500 coupled to ice cream retaining assembly 420. Specifically, ice cream container 450 is inverted and inserted into sleeve 424 so that wall 460 of ice cream container 450 is adjacent wall 426 of sleeve 424. In addition, once inserted into sleeve 424, ice cream container 450 is supported at its upper end 454 within sleeve 424, wherein upper rim 470 engages and comes to rest upon or within lip 440, depending upon the configuration of lip 440. Lower end 458 of ice cream container 450 extends above second end portion 428, and particularly second rim 446, of sleeve 424, such that lower rim 474 of ice cream container 450 engages collar 508 and comes to rest within channel 528 of nozzle 500 formed within collar 508, once nozzle 500 is attached to ice cream retaining assembly 420, and particularly sleeve 424. As so supported, ice cream container 450 is prohibited from sliding in any longitudinal direction as it is fully retained and supported at both ends. This inverted and longitudinal support allows the plunger to move in and out of the ice cream container in an efficient manner as the ice cream container remains in a fixed position. Moreover, wall 460 of ice cream container 450 is supported by wall 426 of sleeve 424, thus providing lateral support to ice cream container 450 as well. Again, as the plunger moves in and out of the ice cream container, the combined operable relationship of sleeve 424 and nozzle 500, as well as the inverted manner in which the ice cream container is supported, prevents collapse of the ice cream container and allows significant forces to be applied to the side wall 460 of the ice cream container without its collapse.

Figure 13:
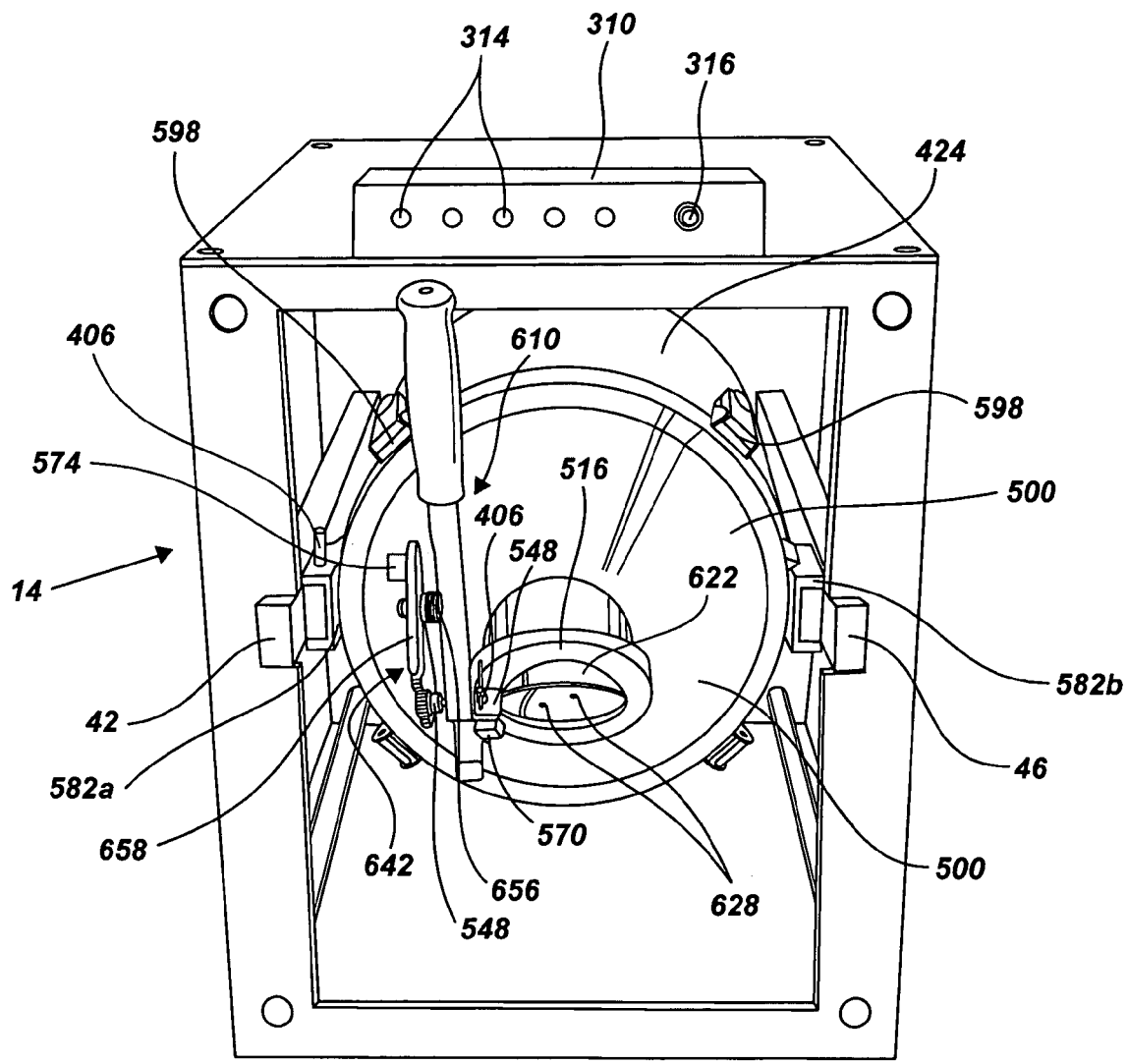
FIG. 13 illustrates an elevated front view of the nozzle and retaining assembly as coupled and supported within the housing of the hard ice cream dispenser.

FIG. 13 illustrates a front perspective view of nozzle 500 as it is coupled to ice cream retaining assembly 420, and particularly sleeve 424, and as these components are coupled within housing 14. Once nozzle 500 is securely coupled to the sleeve, the assembled structure is placed into housing 14. Alternatively, ice cream retaining assembly 420 may be inserted first into housing 14, followed by the attachment and securing of nozzle 500. First coupling nozzle 500 to sleeve 424 before insertion of the entire assembly into hosing 14 is not required. In any event, sleeve 424 (as containing an ice cream container) is inserted into housing 14 where its first end portion is supported by one or more sleeve supports (not shown, but see FIG. 1). To secure nozzle 500 to housing 14, coupling means 582-*a* and 582-*b* on opposing sides of nozzle 500 are aligned with and slid onto retaining rails 42 and 46, respectively. Once properly positioned, set pins 406 are inserted into the aligned apertures in the coupling means and the retaining rails, wherein nozzle 500 is secured into place, thus also securing the second end portion of sleeve 424 within housing 14. As can be seen, nozzle 500, and particularly spout 516, protrudes out from housing 14 a pre-determined distance. Other embodiments may contain nozzle 500 entirely within housing 14.

FIG. 13 also illustrates ice cream scoop 610 as coupled to nozzle 500. Ice cream scoop 610 is pivotally coupled to nozzle 500 so that scoop 622 interacts with spout 516 to capture the ice cream and to consistently and repeatedly dispense spherical scoops of ice cream. Again, a set pin 406 is used to secure ice cream scoop to scoop support 548, which is attached to nozzle 500 adjacent spout 516, as well as to align actuating arm 658 of cam 642 with cam stop 574. Scoop 622 is further shown comprising a plurality of air vents formed therein for venting air during as the plunger moves through the ice cream container.

FIG. 13 further illustrates five gauges in the form of lights 314 positioned within contents indicator 310 atop housing 14. Contents indicator 310 further supports and houses on/off switch 316 electrically coupled to the motor that the user uses to activate and control the dispenser.

FIG. 14 illustrates a detailed view of the attachment of one side of nozzle 500 to retaining rail 42. Specifically, coupling means 582-*a*, comprising a side support configuration 586-*a* forming a channel 590-*a* therein, removably couples to block 44 extending from retaining rail 42. Block 44 comprises an aperture (not shown) formed therein that aligns with an aperture extending through side support 586-*a*. Once aligned, a set pin 406 is inserted through the apertures to secure coupling means 582 (and nozzle 500) in place with respect to retaining rail 42. The positioning of coupling means 582 with respect to retaining rail 42 may vary and may even be adjustable, thus allowing nozzle 500 to be adjustable.

It is noted herein that, where applicable or practical, set pins, or similar attachment means, are used to couple the various components together and to housing 14. The use of set pins instead of other attachment means, such as screws, etc., is preferred by the National Sanitation of Foods (NSF). Set pins provide many advantages over other attachment means in that they are easy to insert and remove, thus making the assembly and disassembly of the various components much more efficient. Set pins are also easy to clean and to keep clean, thus contributing to a much more sanitary environment.

Figure 15:
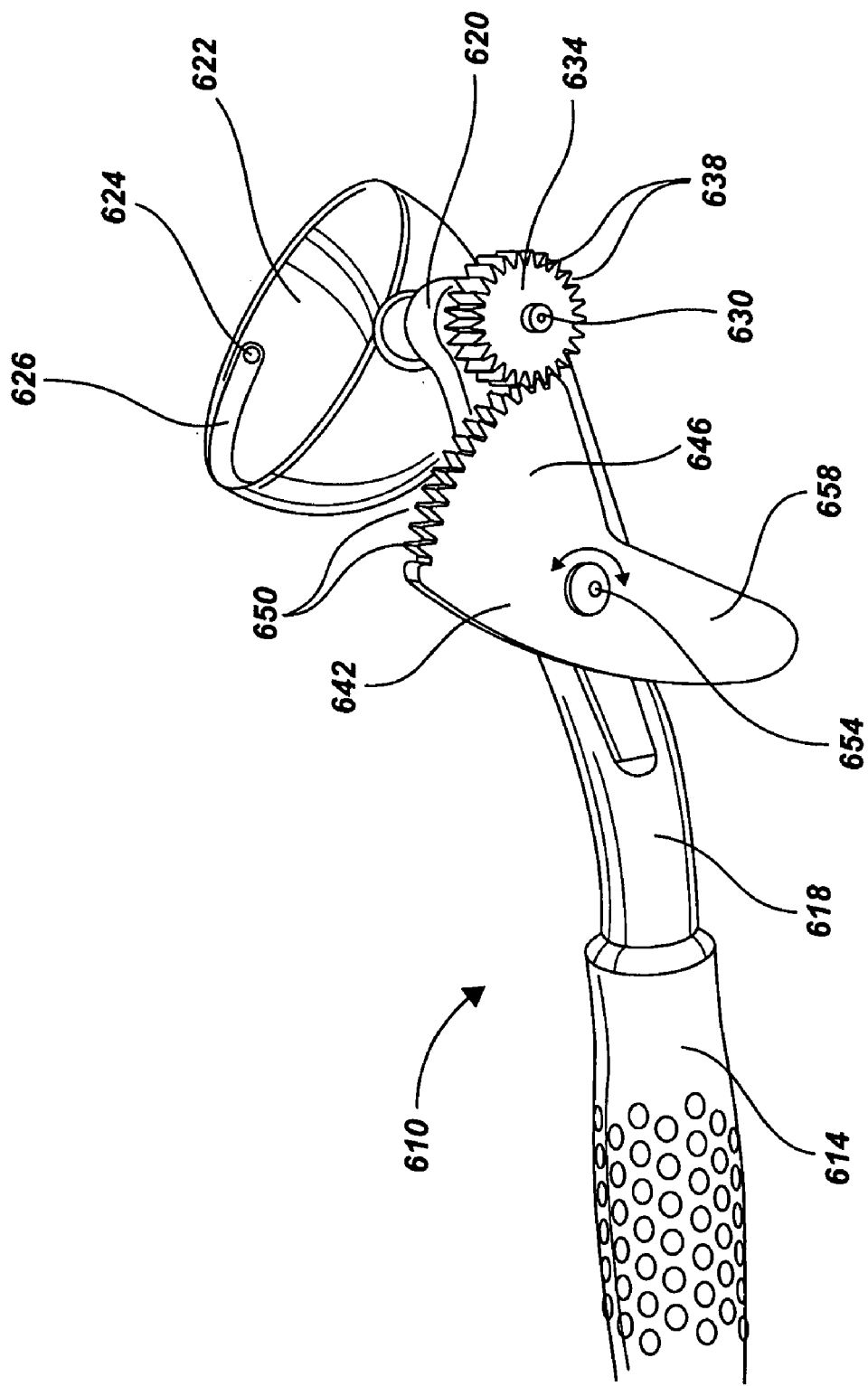
FIG. 15 illustrates a perspective view of an ice cream scoop according to one exemplary embodiment of the present invention, wherein the ice cream scoop attaches to the nozzle of the hard ice cream dispenser.

FIG. 15 illustrates a perspective view of an exemplary ice cream scoop 610. In this embodiment, ice cream scoop 610 comprises shaft 618 extending to form a handle 614 at one end. An opposing end of shaft 618 comprises a semi-spherical scoop 622 having a radius similar or equivalent to standard scoops. Scoop 622 is coupled to shaft 618 through a perpendicular or laterally extending support rod 620. Scoop 622 may be removably coupled to shaft 618 via rod 620, or it may be integrally formed with shaft 618 via rod 620. Scoop 622 comprises a standard ice cream scoop configured to dispense a standard sized scoop of ice cream.

Ice cream scoop 610 further comprises a removal system to facilitate the removal of ice cream from the scoop once received or dispensed therein. Pivotally supported within and at opposing sides scoop 622 is blade 626. Blade 626 comprises a curved member extending from the perimeter on one side of the scoop to the perimeter of the opposing side of the scoop, and supported by axle 630 that rotates upon actuation of gear 634. Blade 626 further comprises a radius that is approximate, but slightly less than, the inside radius of scoop 622, such that, when actuated, blade 626 functions to travel along the inside surface of scoop 622 to facilitate removal of a scoop of ice cream from the scoop. Blade 626 is commonly known in the art.

Ice cream scoop 610 further comprises a pivot pin 624 for inserting into a corresponding pivot mount formed within nozzle 500, and particularly spout 516. Pivot pin 624 comprises a protruding member that extends outward from the perimeter of scoop 622 at a location coaxial with axle 630 and rod 620. Pivot pin 624 is configured to allow ice cream scoop 610 to pivot with respect to spout 516, thus properly dispensing a single scoop of ice cream with each actuation of ice cream scoop 610. Pivot pin 624 supports the removable coupling of ice cream scoop 610 to nozzle 500 on one side of scoop 622, while rod 620 supports the coupling of ice cream scoop 610 to nozzle 500 at an opposite side of scoop 622. Rod 620 and pivot pin 624 engage a portion of nozzle 500 and operate together to allow ice cream scoop to pivot about spout 516.

Ice cream scoop 610 further comprises a cam assembly for actuating blade 626. Specifically, ice cream scoop 610 comprises a gear 634 rotatably attached to axle 630. Axle 630 extends through a conduit formed within rod 620 and couples to a proximate end of blade 626, wherein rotation of axle 630 causes rotation of blade 626. Gear 634 comprises a plurality of teeth 638 formed therein that extend annularly around the perimeter of gear 634. Pivotally attached to shaft 618 via attachment means 654, shown as a thumb screw, and complementing gear 634 is cam 642. Cam 642 comprises a curved upper portion 646 integrally formed with an actuating arm 658. Curved upper portion 646 also comprises a plurality of teeth 650 configured to engage teeth 638 of gear 634. Actuation of cam 642 effectively functions to drive gear 634, which subsequently rotates axle 630 and actuates blade 626.

Cam 642 is biased using one of several types of commonly known biasing elements, such as the coil spring 656 shown in FIG. 13. Coil spring 656 is coupled to shaft 618 at one end and cam 642 at another end. Coil spring 656 is configured to bias cam 642 in a non-actuated position. Stated differently, coil spring 656 functions to bias cam 642 so that blade 626 is in a non-actuated position.

Figure 16:
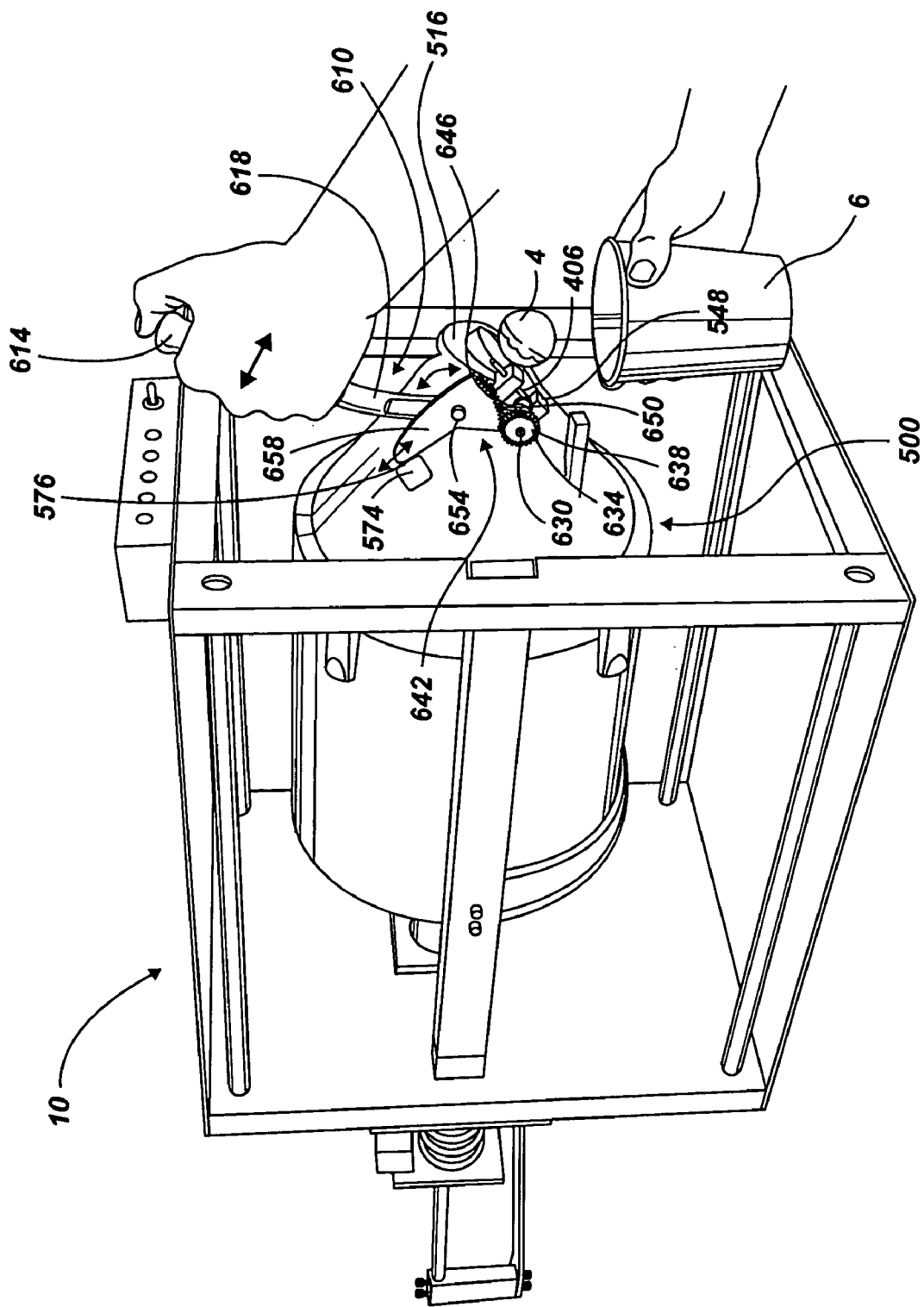
FIG. 16 illustrates a detailed perspective view of the exemplary ice cream scoop as attached to the nozzle and in an actuated state to dispense a scoop of ice cream.

With reference to FIG. 16, ice cream scoop 610 is shown attached to nozzle 500, held in place by set pin 406, in an actuated position to dispense a scoop of ice cream 4 into an ice cream cone 6 (or other suitable receptacle). As can be seen, grasping handle 614 and rotating shaft 618 of ice cream scoop 610, as attached to nozzle 500, upward in the direction indicated by the arrows from its resting position against rest 670 actuates ice cream scoop 610 to dispense a scoop of ice cream 4. Specifically, rotation of ice cream scoop 610 causes scoop 622 to rotate within and with respect to spout 516. Spout 516 comprises a diameter that is approximately the same, but slightly less, than the outside diameter of scoop 622, thus prohibiting ice cream from leaking between the inside surface of spout 516 and scoop 622. In addition, spout 516 is configured to receive scoop 622 therein. In other words, when ice cream scoop 610 is in its resting position, the receiving or convex side of scoop 622 is faced inward towards the opening of spout 516, which effectively shuts spout 516, or rather closes off the opening of spout 516. The resting position of ice cream scoop 610 and the closing off of spout 516 is shown in FIG. 13. In this position, scoop 622 is ready to receive ice cream as the plunger progresses forward. Any forward progression by the plunger forces ice cream through nozzle 500, out spout 516, and into scoop 622. Once full, progression of the plunger halts according to the pressure regulator assembly discussed above. At this time, the ice cream dispenser is ready to dispense a scoop of ice cream. Again, grasping handle 614 and rotating shaft 618 upwards causes scoop 622 to rotate. Based on the pivoting axis defined by the attachment points of ice cream scoop 610 to nozzle 500, scoop 622 will rotate with respect to spout 516. In the embodiment shown, the pivoting axis is along the perimeter rim of scoop 622. As such, any rotation of ice cream scoop 610 will effectively cause scoop 622 to travel within spout 516 and nozzle 500, as shown. Full rotation of scoop 622 causes its perimeter rim portion to cut through the ice cream along a circular path, thus carving out a spherical scoop of ice cream from nozzle 500 by the time actuation arm 576 contacts cam stop 574.

As stated, upward rotation of ice cream scoop 610 further causes actuation arm 658 of cam 642 to contact surface 576 of cam stop 574. Further rotation of ice cream scoop 610 effectively actuates cam 642. Specifically, through further rotation of shaft 618, actuator arm 658 is pushed against cam stop 674. This causes cam 642 to rotate about its pivot point located at the connection of attachment means 654. As cam 642 pivots, gear 634 is caused to rotate due to the engaged relationship between teeth 650 on cam 642 and teeth 638 on gear 634. And, since gear 634 is coupled to axle 630, which is coupled to blade 626, blade 626 is caused to rotate and travel about the inside surface of scoop 622. The further ice cream scoop 610 is rotated, the more cam 642 pivots until blade 626 has traveled from one side of scoop 622 to the other, at which time shaft 618 also contacts cam stop 574, thus prohibiting any further rotation of ice cream scoop 610 and shaft 618. The action of blade 626 functions to release the scoop of ice cream 4 from scoop 622 into ice cream cone 6 (or other suitable receptacle) as commonly known in the art. The biased nature of cam 642 causes cam 642 to pivot in the opposite direction and blade 626 to return to its initial starting position as ice cream scoop is rotated downward in the opposite direction. Once actuation arm 658 leaves cam stop 574, cam 642 and blade 626 are both in their initial starting positions. The process may be repeated as the plunger progresses forward and again fills scoop 622 with ice cream.

Figure 17:
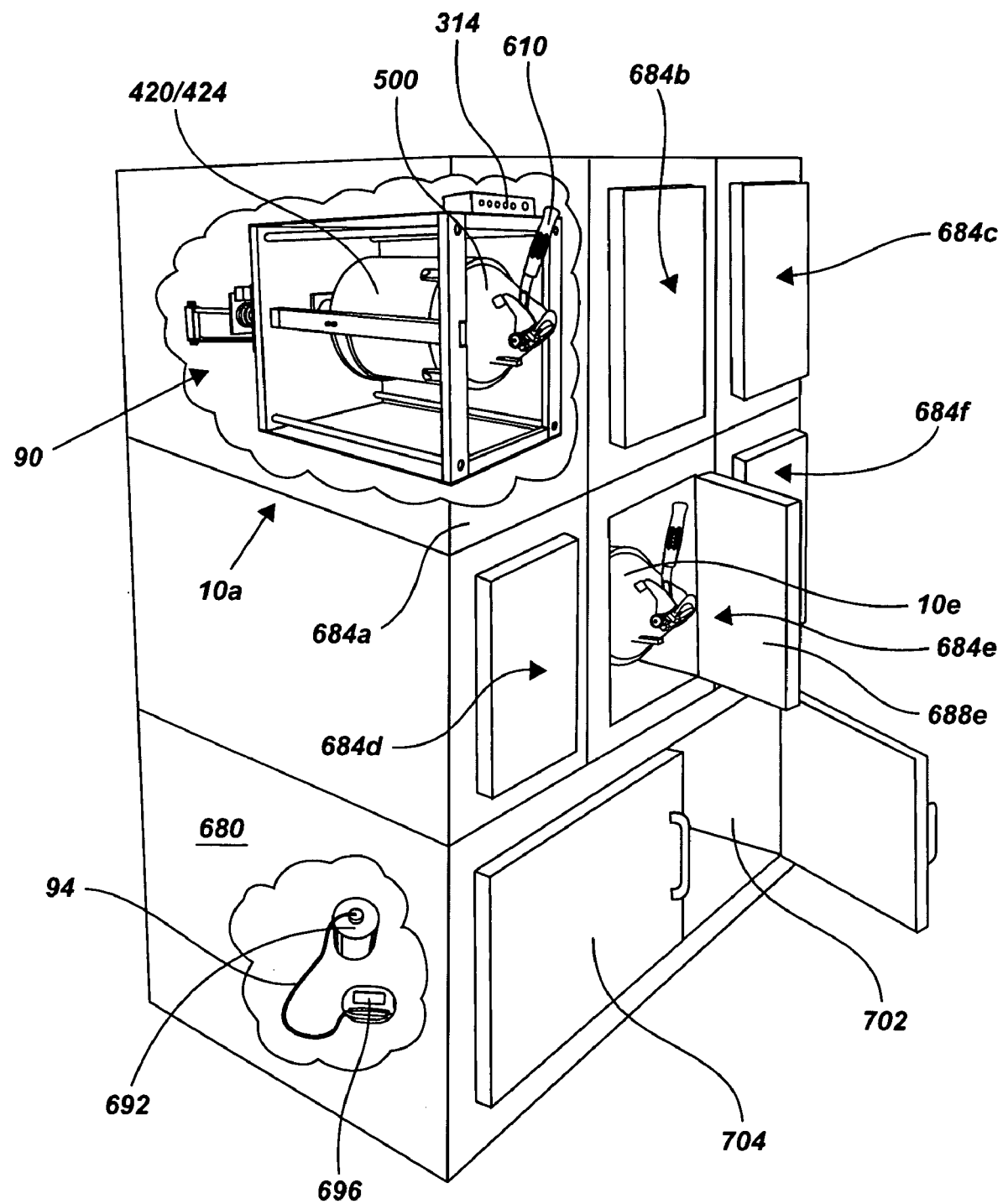
FIG. 17 illustrates a modular freezer unit comprising a plurality of separate and independent hard ice cream dispensers contained and supported within various freezer modules, wherein each hard ice cream dispenser contains a different food product or flavor of ice cream and a product temperature measuring and monitoring device.

FIG. 17 illustrates a modular freezer unit 680 as comprising several modules 684 for supporting a hard ice cream dispenser 10 therein. Specifically, FIG. 17 illustrates six separate modules, each having a compartment configured to support an independently operated hard ice cream dispenser therein, thus allowing the user to provide several different flavors of ice cream. As shown, hard ice cream dispenser 10-a is supported within modular compartment 684-a that operably engages housing 14 used to support the various components of hard ice cream dispenser 10-a, namely, drive assembly 90, transfer assembly 130, pressure regulation system 170, plunger guide system 250, plunger 330, ice cream retaining assembly 420, nozzle 500, and ice cream scoop 610, each as described above. Each of the additional hard ice cream dispensers contained within the respective modular compartments 684-a–684-f function in a similar manner as the one shown in compartment 684-a. In addition, each modular component 684 of freezer 680 further comprises a door 688 to enclose the hard ice cream dispenser 10 contained therein and to prevent severe temperature differentials by containing the cooled air as much as possible.

To further control temperature differentials, a thermostat 692 is placed within freezer 680. Thermostat 692 is electrically connected to temperature display device 696 (located outside freezer 680) via wire 694 to provide an accurate reading of the current temperature within freezer 680. Thermostat 692 may comprise any type of device known in the art, but preferably comprises a canister filled with a substance having a similar consistency as hard ice cream, such as Crisco oil. Temperature display device 696 will continuously display the temperature of the like substance contained within the canister of thermostat 692, thus giving the user an accurate reading of the temperature of the hard ice cream within the containers supported within the respective dispensers and/or the storage compartment 702. The ambient temperature within freezer 680 may be varied to control the temperature of the like substance contained within the canister of thermostat 692, thus also controlling the temperature of the ice cream contained within the freezer. As such, the ambient temperature in the freezer is dictated by the reading of the temperature of the substance within the container as registering on temperature display 696. The temperature of the ice cream is important because of the various inherent flow properties of the ice cream. Indeed, the different flow characteristics exist for different hard ice creams (of other food products), wherein the flow characteristics are affected by the temperature of the hard ice cream. Thus, the ambient temperature of the freezer may be controlled to maintain the temperature of the like substance within the thermostat at an optimal temperature, which optimal temperature represents the pre-determined temperature (or range of temperatures) of the ice cream identified for providing optimal flow as dispensed from the dispenser unit. Alternative embodiments may comprise a separate freezer in each modular compartment, thus allowing the user to control and vary the temperature in each compartment independent of any other. In addition, each compartment may comprise an independently operating thermostat.

FIG. 17 further illustrates freezer 680 comprising one or more storage compartments 702. Storage compartments 702 function to house and store additional containers of ice cream at the same temperature as that in each of the individual compartments housing an ice cream dispenser. Thus, when one container is emptied, a new container may be retrieved from storage compartment 702, wherein the ice cream will be ready to dispense immediately. Storage compartments 702 are enclosed using doors 704. Storage is important because the proper or optimal temperature at which the particular type or flavor of ice cream flows may be achieved prior to it being loaded into the dispensing system. As such, the ambient temperature of the freezer is controlled or dictated by the product temperature as measured by the thermostat 692.

Method of Dispensing Hard Ice Cream

The present invention further features a method dispensing hard ice cream, which method comprises operation of the hard ice cream dispenser as described above. In operation, to dispense hard ice cream from the hard ice cream dispenser described above, the housing is secured and the support tube of the plunger is operably connected to the plunger guide system. Specifically, the support tube of the plunger is inserted into the casing over the stabilizer bar, thus allowing the plunger to be supported in a cantilevered manner within the housing. The plunger drive means is then coupled to the plunger. In one exemplary embodiment, this involves coupling the first and second ball screws to the back or base of the plunger. Once the plunger drive means is attached, the plunger may be positioned in its fully retracted position by actuating the drive assembly to retract the plunger as needed. In this position, the hard ice cream dispenser is ready to receive a new or full container of ice cream.

To load the hard ice cream dispenser a standard container of ice cream of a select flavor is obtained. In order to operate the dispenser properly, the bottom of the ice cream container is removed using any known means (e.g., cutting out the bottom) to obtain an open-end cylinder of ice cream. Once the bottom of the container is removed, the container is inverted and the upper end portion or top end of the ice cream container is inserted into the first or upper end of the sleeve until the upper rim of the ice cream container contacts or otherwise engages the lip or series of lips annularly surrounding the interior surface of the sleeve near its lower end portion. Of course, the sleeve may or may not already be contained and supported within the housing when the ice cream container is inserted into the sleeve. In any event, the lip within the sleeve functions to ensure that the ice cream container is properly positioned and supported in a longitudinal direction within the sleeve. As noted above, the combination of the sleeve and the ice cream container as inserted and supported within the sleeve is referred to herein as the ice cream retaining assembly.

Once the ice cream container is inserted into the sleeve, the nozzle is placed over the ice cream retaining assembly an secured thereto. Specifically, the nozzle functions to engage the portion of the ice cream container extending or protruding from the upper rim of the sleeve, such that the lower rim of the ice cream container is seated within the channel formed within the rim of the nozzle. With the lower rim of the ice cream container seated within the channel of the nozzle, the nozzle is coupled to the sleeve using any known attachment means, such as a common latch assembly. Coupling the nozzle to the sleeve effectively locks the ice cream container in a fixed position as both ends are strictly supported, one by the sleeve and the other by the nozzle. This essentially functions to eliminate longitudinal movement of the ice cream container during actuation of the plunger. In addition, due to the rigidity of the sleeve, all lateral and other forces acting on the walls of the container as a result of the displacing plunger are reduced or eliminated. Rather, the forces acting upon the wall of the ice cream container are instead borne by the sleeve, thus allowing the ice cream container (which is typically made of cardboard) to withstand such forces.

The ice cream retaining assembly is supported horizontally within the housing. The sleeve is inserted into the housing as shown in FIG. 1 so that its outer surface contacts the sleeve support extending between the opposing retaining rails. The sleeve is inserted far enough into the housing to allow the nozzle to be coupled to the sleeve and also supported by the retaining rails. Specifically, the nozzle, as attached to the sleeve, comprises one or more coupling means that allow the nozzle to attach to the housing. In the embodiment shown in FIG. 1, the nozzle comprises two opposing coupling means that each engage a retaining rail. Formed within the coupling means are apertures that are designed to align with corresponding apertures in the retaining rails, wherein a set pin may be inserted to securely, removably, attach the nozzle to the housing. Once the nozzle is secured to the sleeve and the housing, the ice cream container is locked into place and is ready to receive the plunger. The ice cream scoop is then installed onto the nozzle, thus closing off the spout and preparing the nozzle to receive ice cream.

Plunger displacement is achieved by actuating the drive assembly, and particularly the plunger drive means, which is shown herein as first and second ball screws, each of which are attached to the plunger. Actuation of the motor in a forward direction causes the plunger to advance forward towards the sleeve and the upper portion of the retained ice cream container. Since the plunger, with its dynamic seal, is in a relaxed state, or is non-energized, the plunger is able to pass through the opening in the upper portion of the sleeve without hindrance from the rim or wall of the sleeve. Likewise, due to the configuration of the sleeve and its relationship with the ice cream container, further advancement of the plunger into the ice cream container is also achieved without hindrance from the rim or wall of the ice cream container. Due to its conical shape, advancement of the plunger into the ice cream container causes the nose of the plunger to initially come in contact with the ice cream contained within the container. Once the plunger contacts the ice cream, it begins to exert a force on the ice cream for the purpose of displacing the ice cream from the container, into the nozzle, and out the spout.

As the plunger displaces forward within the ice cream container and against the ice cream, the compression pressure is increased. The increase in compression pressure functions indicates that the plunger is exerting a determinable amount of force upon the ice cream, such that the plunger is subjected to a compression pressure. Upon reaching a pre-determined compression pressure, the dynamic lead of the plunger displaces and presses against the base of the plunger. The displacement of the dynamic lead towards the base effectively forces the dynamic seal into the cavity or recess in the back of the dynamic lead portion of the plunger. This action causes the dynamic seal to flex and push outward against the sides of the ice cream container. In this state, it can be said that the plunger is energized. In its energized state the plunger is effective at sealing the wall of the ice cream container and forcing the flow of the ice cream. When the compression pressure is released, or when the plunger is retracted, the dynamic lead pulls away from the base, wherein the base retracts from the cavity, thus causing the dynamic seal to relax and return to its resting position. With the dynamic seal in a relaxed position, the plunger can easily and efficiently be moved into and retracted from the inside of the ice cream container without being hindered or obstructed.

In order to achieve flow, the plunger must overcome the breakaway pressure inherent within the hard ice cream as contained within the container. Under normal freezing conditions, the breakaway pressure for hard ice cream is around 4–5 p.s.i, which is approximately 300 lbs. over a 72 square inch surface area, roughly that of a cross-section of ice cream within a standard container. As such, the plunger must exert around 300 lbs. of pressure on the ice cream to initiate flow. Once the breakaway pressure is overcome, the pressure may be reduced to maintain the flow. Specifically, once flowing, hard ice cream will continue to flow under a pressure of about 2–3 p.s.i. at a temperature of 5° F. It should be noted that there are several variables that affect the breakaway pressure, as well as the flow pressure, such as the type of ice cream (i.e., different hard ice creams comprise different consistencies), the freezing temperature, the size of the container, and others.

In light of the different breakaway and flow pressures that may be experienced by the hard ice cream dispenser, there is equipped thereon a pressure regulation system. The pressure regulation system functions to allow the plunger to displace automatically and also to shut-off automatically. Thus, depending on the consistency of different ice creams, as well as the temperature each one requires for proper freezing, the pressure regulation system can be adjusted to accommodate these different types.

As the plunger overcomes the breakaway of the ice cream and the ice cream begins to flow, it is displaced through and out of the lower end of the container and into the nozzle. The plunger keeps moving forward until the ice cream fills the nozzle, as enclosed by the scoop or another suitable structure, thus leaving the nozzle devoid of any volume of space. Within the nozzle, the flowing ice cream is subjected to the inside surface of the nozzle. The inside surface of the nozzle may be uniform or it may comprise a plurality of non-uniform surface areas. For example, in one exemplary embodiment, the upper surface of the nozzle may comprise a flattened surface area that is adjacent the spout, wherein the flattened area facilitates the flow of the ice cream across the area and into the spout. The lower surface of the nozzle may comprise a raised or inclined surface area that is positioned directly opposite the upper flattened area, wherein the flow of ice cream is hindered. The combination of these two complementary and opposing surface areas functions to facilitate the even flow of ice cream into a downwardly angled or oriented spout. Stated differently, the flow of ice along the top of the nozzle is faster than the flow of ice cream along the bottom of the nozzle. This allows the ice cream flowing along the upper surface of the nozzle to reach the opening of the spout at the same time as the ice cream flowing along the bottom surface of the nozzle. Since the opening of the spout is oriented downwards, the ice cream flowing along the upper surface must travel a greater distance to reach the opening than the ice cream flowing along the bottom surface. The flattened upper surface area facilitates faster flow of the ice cream along the upper surface, while the steep surface area hinders or slows the flow of the ice cream along the bottom surface. As such, flow of the ice cream out of the nozzle is made even and consistent.

With the continued application of pressure by the plunger on the ice cream, the ice cream is eventually forced out of the spout. Preferably there is an ice cream scoop attached to the nozzle such that its concave surface is positioned to receive the ice cream immediately upon its exit from the spout. As the ice cream exits the spout and fills the scoop, the plunger continues its forward displacement. Once the scoop is full, the available space for ice cream to flow into is exhausted. At this time, any continued forward movement by the plunger will be subject to resistance from the trapped ice cream. If the pressure becomes greater than the initial threshold pre-load pressure built into the pressure regulation system, the forward movement of the plunger ceases. At this time, continued forward rotation by the motor will cause the movable compression plate to displace in a backward direction towards the adjustably positioned limit switch, which is strategically positioned as a result of the particular type of ice cream loaded into the dispenser. Once the limit switch is reached, the switch is triggered and the motor is automatically shut-off. Moreover, as the movable back plate displaces backward, the instant compression pressure increases. Any reduction of pressure on the plunger that is lower than the instant compression pressure will cause the movable compression plate to spring forward. Thus, the pressure regulation system functions to monitor the pressure on the plunger and to respond accordingly. Any forward movement of the movable compression plate also functions to move the plunger forward. When the movable compression plate seats against the stoppers, thus indicating its initial resting position, the current compression pressure is at or below the initial threshold pre-load compression pressure. As indicated above, the movable compression plate moves back and forth within a range of compression pressures that are above the threshold pre-load pressure.

Once the plunger displaces a sufficient distance to fill the ice cream scoop with ice cream, the pressure on the plunger increases. As soon as the threshold pre-load pressure is overcome, the movable compression plate displaces backwards until the limit switch is tripped, or the pressure on the plunger is reduced below the instant compression pressure. After filling the scoop with ice cream, the entire ice cream scoop is actuated by lifting the handle and rotating the ice cream scoop about its pivoting axis. Rotation of the ice cream scoop in an upward direction causes the scoop containing the ice cream to also rotate. Rotation of the scoop effectively causes the rim of the scoop to cut through the ice cream along its path of rotation, thus creating a spherical ball of ice cream. Upon obtaining the spherical ball of ice cream, the blade of the ice cream scoop may be actuated to facilitate removal of the ball of ice cream from the scoop into a suitable receptacle or edible cone. As the ice cream scoop releases from the scoop the handle is rotated in the opposite direction. Downward rotation of the ice cream scoop causes the concave surface of the scoop to once again come in contact with and face the spout, thus creating a void or volume of space between the spout and the surface of the scoop. This volume of space is detected by the pressure regulation system. The newly created volume of space functions to cause a decrease of the instant compression pressure within the system, wherein the movable compression plate displaces forward. The forward displacement of the movable compression plate also causes the plunger to move forward. As the plunger moves forward, the ice cream is again caused to flow, thus forcing ice cream into the volume of space and filling the ice cream scoop with another portion of ice cream. The process is repeated over and over until the ice cream container is empty, at which time another is loaded in its place. As can be seen, the specific dispensed ice cream is consistent each time, thus providing greater control over the portions served.

The hard ice cream dispenser provides for consistent and accurate portions of ice cream to be dispensed each time. In addition, user error is decreased as the subjectivity of providing a portion of ice cream is eliminated. Thus, costs are more easily predicted as the needed inventory and purchase of ice cream is more easily predicted.

Other exemplary embodiments may utilize various devices or systems, other than an ice cream scoop, to slice or cut through the ice cream once a pre-determined portion size has been dispensed. As such, the ice cream scoop discussed herein and shown in the drawings should not be construed as limiting in any way.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. Accordingly, the scope of the invention should be determined solely by the appended claims and their legal equivalents, rather than by the descriptions and examples given above.

What is claimed and desired to be secured by Letters Patent:

1. A hard ice cream dispenser comprising:
    a housing support structure;
    a drive assembly supported by said housing, said drive assembly comprising a plunger drive means for displacing a plunger;
    a container retaining assembly supportable within said housing and comprising a sleeve configured to receive and support a container of hard ice cream therein, said sleeve providing lateral and longitudinal support to said container as said plunger travels through said container to dispense said hard ice cream contained therein; and
    a nozzle removably coupled to an end of said support sleeve so as to be in fluid communication with said container of said hard ice cream, said nozzle comprising a spout for controlling the cross-sectional area of said dispense said hard ice cream; and
    said plunger supported within said housing and removably coupled to said plunger drive means, said plunger drive means being configured to displace said plunger, said plunger comprising a dynamic seal that flexes from a relaxed, non-energized state to an extended, energized state at a pre-determined compression pressure, wherein in an energized state said dynamic seal contacts and seals against a wall of said container, said plunger displacing said hard ice cream from said container, into and through said nozzle, and out said spout.

2. The hard ice cream dispenser of claim 1, further comprising a pressure regulation system operable with said drive assembly for regulating the forward displacement and exerted compression pressure of said plunger and for providing semi-automatic dispensing of said hard ice cream.

3. The hard ice cream dispenser of claim 1, further comprising an ice cream scoop pivotally and removably attached to said nozzle, said spout configured to align and interact with a scoop portion of said ice cream scoop such that said hard ice cream dispensed from said spout is captured by said scoop, wherein actuation of said ice cream scoop functions to dispense a spherical scoop of said hard ice cream.

4. The hard ice cream dispenser of claim 1, wherein said drive assembly comprises:
    said plunger drive means in the form of first and second ball screws removably coupled to said plunger for driving said plunger;
    a motor; and
    a transfer assembly operably connected to said motor for transferring power from said motor to said first and second ball screws.

5. The hard ice cream dispenser of claim 1, wherein said container of said hard ice cream is supported in an inverted orientation within said sleeve such that said plunger forces said hard ice cream out of the bottom portion of said container.

6. The hard ice cream dispenser of claim 1, wherein said plunger comprises:
    a plunger support tube configured to removably couple to a plunger guide system, thus supporting said plunger within said housing;
    a dynamic lead supported on said plunger support tube and having a nose and a conical shoulder extending therefrom to a rim that has a diameter less than an inside diameter of said container, said dynamic lead being movable about said plunger support tube in response to a pre-determined compression pressure; and
    a base also supported on said plunger support tube, said base removably coupled to said plunger drive means and comprising a diameter less than said inside diameter of said container, said dynamic seal contained between said dynamic lead and said base such that said dynamic lead displaces towards said base under said pre-determined compression pressure, thus compressing and energizing said dynamic seal.

7. The hard ice cream dispenser of claim 6, wherein said plunger guide system comprises:
    a casing coupled to the housing, said casing comprising an elongated tube coupled to said housing and having a pre-determined inside diameter;
    a stabilizer core supported coaxially within said casing, said stabilizer core having a pre-determined outside diameter that is less than said inside diameter of said casing so as to define an annular gap between said casing and said stabilizer core configured to receive said plunger support tube therein, said plunger support tube displacing within said casing about said stabilizer core during displacement of said plunger.

8. The hard ice cream dispenser of claim 6, wherein said plunger comprises a scoop set formed within said nose, said scoop set having a pre-determined radius configured to mate with a semi-spherical scoop of an ice cream scoop during actuation of said scoop.

9. The hard ice cream dispenser of claim 1, further comprising a contents indicator for indicating the current amount of product existing within said container at a given time, said contents indicator comprising:
    a switch board supported in a fixed position relative to said plunger drive means;
    a plurality of switches strategically positioned about said switch board at pre-determined locations, each of said switches electrically coupled to a corresponding gauge, respectively, viewable by a user; and
    a trigger plate coupled to said plunger drive means, said trigger plate configured to consecutively trip said switches on contact as said plunger drive means advances, thus indicating to said user a specific position of said plunger within said container, which position corresponds to a remaining amount of said product.

10. The hard ice cream dispenser of claim 1, wherein said retaining assembly is supported horizontally within said housing.

11. The hard ice cream dispenser of claim 1, further comprising a dorsal wall plate coupled to said housing for providing increased structural support to said housing and to the components supported by said housing.

12. The hard ice cream dispenser of claim 9, wherein said contents indicator comprises a digital electronic device that monitors and indicates the remaining scoops available in said container.

13. A hard ice cream dispenser comprising:
a housing support structure;
a drive assembly supported by said housing, said drive assembly comprising a plunger drive means for displacing a plunger;
a retaining assembly comprising:
a compartment for receiving a hard ice cream container having an upper end portion with an upper rim, a lower end portion with a lower rim, and a wall extending therebetween;
a sleeve surrounding said compartment and being supportable within said housing and configured to receive said container therein in an inverted manner, said sleeve comprising a thin-wall cylinder having a first end, a second end, and a support wall, said first end having a container rim support positioned about an interior surface of said wall that supports said upper rim of said container within said sleeve, said sleeve providing lateral and longitudinal support to said container as said plunger travels therethrough to dispense the hard ice cream contained within said container;
a nozzle removably coupled to a second end of said support sleeve so as to be in fluid communication with said container, said nozzle comprising a spout for controlling the cross-sectional area of said dispense said hard ice cream; and
said plunger supported within said housing and removably coupled to said plunger drive means to force said hard ice cream from said container, into said nozzle, and out of said spout.

14. The hard ice cream dispense of claim 13, further comprising a pressure regulation system operable with said drive assembly for regulating the forward displacement of said plunger and for providing automatic dispensing of said hard ice cream.

15. The hard ice cream dispenser of claim 13, wherein said sleeve is comprised of an insulating material to assist in the maintenance of a pre-determined product temperature.

16. The hard ice cream dispenser of claim 13, wherein said container rim support comprises an annular lip.

17. The hard ice cream dispenser of claim 13, wherein said container rim support comprises a series of nubs strategically positioned about said interior surface.

18. The hard ice cream dispenser of claim 13, wherein said container rim support is positioned a pre-determined distance from a first rim of said first end of said sleeve, such that a lower end of said container protrudes a distance above a second rim of said second end portion of said sleeve.

19. The hard ice cream dispenser of claim 13, wherein said nozzle comprises a collar having a channel formed therein for receiving and supporting said lower rim of said lower end portion of said container as said nozzle is coupled to said sleeve, said channel of said nozzle and said container support of said sleeve functioning to provide longitudinal support to said container, thus allowing said plunger to move through said container without displacing it.

20. A hard ice cream dispenser comprising:
a housing support structure;
a drive assembly supported by said housing, said drive assembly comprising a plunger drive means for displacing a plunger;
a retaining assembly supportable within said housing and comprising a sleeve configured to receive and support and a container of hard ice cream therein, said sleeve providing lateral and longitudinal support to said container as said plunger travels through said container to dispense the hard ice cream contained therein;
a nozzle removably coupled to an end of said support sleeve so as to be in fluid communication with said container of hard ice cream, said nozzle removably coupled to said housing and comprising:
a collar having a channel that engages and supports a rim of said hard ice cream container;
a spout for controlling the cross-sectional area of said dispense said hard ice cream;
a conical shoulder extending from said collar to said spout, said conical shoulder having an outer and inside surface, said inside surface comprising a plurality of integrally formed and varying surface areas designed to facilitate a pre-determined flow pattern of said hard ice cream through said spout;
a spout for controlling the volume and cross-sectional size of said dispense said hard ice cream; and
said plunger supported within said housing and removably coupled to said plunger drive means to force said ice cream from said container, into said nozzle, and out of said spout.

21. The hard ice cream dispenser of claim 20, wherein said sleeve, said container, and said nozzle are supported horizontally within said housing.

22. The hard ice cream dispenser of claim 21, wherein said spout of said horizontally supported nozzle is oriented downward a pre-determined angle from the vertical, and wherein said conical shoulder comprises a relatively flatted upper portion leading into said spout and a lower steeped portion also leading into said spout, such that flow of said ice cream along the upper portion of said nozzle is faster than along said lower portion.

23. The hard ice cream dispenser of claim 20, wherein said nozzle further comprises an ice cream scoop support and a pivot mount opposite said ice cream scoop support, each of which are integrally formed within a rim portion of said spout for pivotally supporting an actuating ice cream scoop therein, said ice cream scoop closes off said spout to receive said ice cream as it is being forced out of said spout, wherein once full, said ice cream scoop is actuated, thus pivoting with respect to said spout to dispense a scoop of ice cream.

24. The hard ice cream dispenser of claim 23, wherein said nozzle further comprises a cam contact extending from an outer surface of said conical shoulder and positioned to receive a cam of said ice cream scoop upon actuation, said cam contact actuating said cam upon actuation of said ice cream scoop, wherein actuation of said cam subsequently actuates a blade within said ice cream scoop that facilitates removal of said scoop of ice cream from said ice cream scoop.

25. A hard ice cream dispenser comprising:
a housing support structure;

a drive assembly supported by said housing, said drive assembly comprising a plunger drive means for displacing a plunger;

a retaining assembly supportable within said housing and comprising a sleeve configured to receive and support a container of hard ice cream therein, said sleeve providing lateral and longitudinal support to said container as said plunger travels through said container;

a nozzle removably coupled to an end of said support sleeve so as to be in fluid communication with said container of ice cream, said nozzle comprising a spout for controlling the cross-sectional area of dispensed ice cream;

said plunger supported within said housing and removably coupled to said plunger drive means, said plunger functioning to displace said ice cream from said container, into and through said nozzle, and out said spout; and a pressure regulation system for controlling the movement of said plunger in response to the compression pressure exerted by and on said plunger, said pressure regulation system comprising:

a movable compression plate operably coupled to said plunger drive means and supporting said drive assembly, said movable compression plate biased by at least one biasing element fixedly supported to said housing and that biases said movable compression plate, said plunger drive means, and subsequently said plunger in the forward direction, said biasing element pre-loaded to comprise an initial pre-determined threshold compression pressure existing when said movable compression plate is in a resting position, said movable compression plate is caused to displace backwards, thus compressing said biasing element, in response to an induced compression pressure on said plunger that measures above said initial threshold pre-load compression pressure, wherein said plunger ceases moving forward, said biasing element causes said movable compression plate to move forward as a result of a drop in said compression pressure from a current compression pressure, thus said movable compression plate moves back and forth within a range of compression pressures.

26. The hard ice cream of claim 25, wherein said pressure regulation system further comprises an automatic shut-off switch adjustably positioned rearward of said movable compression plate as dictated by the characteristics of the product loaded into said dispenser, said shut-off switch shutting off the motor of said drive means and halting movement of said plunger upon contact by said movable compression plate at a pre-determined shut-off compression pressure.

27. The hard ice cream dispenser of claim 26, wherein said pressure regulation system further comprises a pressure scale for determining the proper position of said automatic shut-off switch.

28. The hard ice cream dispenser of claim 25, wherein said threshold pre-load compression pressure is approximate the breakaway pressure of hard ice cream.

29. The hard ice cream dispenser of claim 25, wherein said pre-determined shut-off compression pressure is dictated by the type of product loaded into said dispenser.

30. A hard ice cream dispenser comprising:

a housing support structure;

a drive assembly supported by said housing, said drive assembly comprising a plunger drive means for displacing a plunger;

a retaining assembly supportable within said housing and comprising a sleeve configured to receive and support a container of hard ice cream therein, said sleeve providing lateral and longitudinal support to said container as said plunger travels through said container;

a nozzle removably coupled to an end of said support sleeve so as to be in fluid communication with said container of ice cream, said nozzle comprising a spout for controlling the cross-sectional area of dispensed ice cream;

said plunger supported within said housing and removably coupled to said plunger drive means, said plunger functioning to displace said ice cream from said container, into and through said nozzle, and out said spout; and an ice cream scoop removably and pivotally coupled to said nozzle so as to interact with said spout to form and dispense a scoop of said ice cream upon pivoting said ice cream scoop upward, said ice cream scoop comprising:

a shaft having a handle portion formed thereon;

a semi-spherical scoop portion coupled to said shaft and oriented to close said spout and receive said ice cream therein when said ice cream scoop is coupled to said nozzle and is in a resting position, said ice cream scoop pivoting about said spout to cut through said ice cream to form a spherical scoop of said ice cream and to further dispense said scoop of said ice cream.

31. The hard ice cream dispenser of claim 30, wherein said ice cream scoop further comprises a support rod extending laterally from an end of said shaft opposite said handle portion, said support rod removably supported within a scoop support formed about said spout of said nozzle.

32. The hard ice cream dispenser of claim 30, wherein said ice cream scoop further comprises a pivot pin extending from a perimeter portion of said scoop opposite and coaxial with said rod, said pivot pin insertable within a pivot mount formed on said spout, thus allowing said scoop to pivot about said spout to dispense said scoop of said ice cream.

33. The hard ice cream dispenser of claim 30, wherein said ice cream scoop further comprises a removal system for facilitating the removal of said ice cream upon actuation of said ice cream scoop, said removal system comprising:

a blade rotatably supported within said scoop and to an axle extending laterally through said shaft;

a cam assembly for actuating said blade, said cam assembly comprising a biased cam rotatably coupled to said shaft and a gear rotatably coupled to said axle, said cam comprising a plurality of teeth formed thereon for engaging a plurality of complementary teeth formed on said gear, wherein pivoting of said ice cream scoop upward causes said cam to contact a cam stop formed on said nozzle, wherein further pivoting of said ice cream scoop causes said cam to rotate about its axis, which causes said gear to rotate, thus actuating said blade.

34. The hard ice cream dispenser of claim 30, wherein said ice cream scoop further comprises at least one air vent formed within said scoop portion to exhaust the air within said container and said nozzle as said plunger advances to dispense said ice cream.

35. A method for dispensing hard ice cream comprising:

obtaining a container of hard ice cream;

removing a lid and a bottom portion from said container to achieve an open-end cylinder of said ice cream;

loading said container into a support sleeve in an inverted manner so that an upper portion of said container engages and rests upon a container support formed within a pressure end portion of said sleeve and a lower end extends a pre-determined distance above a rim of said sleeve;

coupling a nozzle to said sleeve, said nozzle receiving said lower end portion of said container within a channel formed therein, said nozzle and said sleeve functioning to provide both lateral and longitudinal support to said container;

supporting said coupled sleeve and said nozzle within a hard ice cream dispenser housing;

activating a drive assembly to displace a plunger having a dynamic seal contained therein;

displacing said plunger into said hard ice cream, thus energizing said dynamic seal of said plunger to contact and seal against a wall of said container; and dispensing a pre-determined amount of said hard ice cream from said spout of said nozzle by advancing said plunger a pre-determined distance.

36. The method of claim 35, further comprising coupling an ice cream scoop to said nozzle, wherein said ice cream scoop comprises a semispherical scoop oriented to close off said spout and receive said hard ice cream therein when in a resting position and to dispense said hard ice cream upon actuating said ice cream scoop.

37. The method of claim 36, further comprising actuating said ice cream scoop by pivoting said ice cream scoop about a pivot axis as coupled to said nozzle, said actuating causes said ice cream scoop to cut through said ice cream to form a spherical scoop of said hard ice cream.

38. The method of claim 37, wherein said actuating further comprises actuating a removal assembly for facilitating the removal of the ice cream from said scoop.

39. The method of claim 35, further comprising the step of forming one or more surface areas within an interior surface of said nozzle to control and regulate the flow of said ice cream therethrough and to obtain a pre-determined flow pattern.

40. The method of claim 35, further comprising regulating the compression pressure exerted by said plunger to control the movement of said plunger, said regulating comprises:

setting a threshold pre-load compression pressure in response to the characteristics of the product to be dispensed;

operating said drive assembly above said threshold pre-load pressure to move a movable compression plate within a pre-determined range of compression pressures;

identifying a shut-off compression pressure;

placing an automatic shut-off switch at a location corresponding to said shut-off compression pressure; and causing said movable compression plate to contact said shut-off switch.

41. The method of claim 40, wherein said dispensing causes a drop in compression pressure, thus causing said movable compression plate to displace forward until coming to rest in its resting position, or said plunger again experiencing a compression pressure great enough to cause said movable compression plate to again displace backwards.

* * * * *